United States Patent [19]

Goto et al.

[11] Patent Number: 5,395,563
[45] Date of Patent: Mar. 7, 1995

[54] MANUFACTURING METHOD AND APPARATUS FOR FORMING AN ELONGATE BODY HAVING THICKNESS CHANGE

[75] Inventors: Shinichi Goto; Yoshiaki Ito, both of Inazawa, Japan

[73] Assignee: Toyoda Gosei Co., Ltd., Nishikasugai, Japan

[21] Appl. No.: 13,807

[22] Filed: Feb. 4, 1993

[30] Foreign Application Priority Data

| Feb. 5, 1992 | [JP] | Japan | 4-019732 |
| Feb. 5, 1992 | [JP] | Japan | 4-019733 |
| Sep. 25, 1992 | [JP] | Japan | 4-256371 |

[51] Int. Cl.6 .............................. B29C 47/92
[52] U.S. Cl. ............... 264/40.1; 156/244.13; 156/244.18; 264/40.7; 264/167; 264/177.16; 264/177.20; 264/148; 425/140; 425/142
[58] Field of Search ....... 264/40.1, 40.7, 167, 264/148, 177.1, 177.16, 177.17, 177.19, 177.20, 285, 339; 425/142, 140; 156/244.18, 244.13

[56] References Cited

U.S. PATENT DOCUMENTS

| 4,425,289 | 1/1984 | Lee et al. | 264/40.1 |
| 4,851,067 | 7/1989 | Ogawa et al. | 264/167 |
| 4,865,796 | 9/1989 | Tamura et al. | 264/40.7 |
| 4,968,543 | 11/1990 | Fujioka et al. | |
| 5,070,590 | 12/1991 | Fujioka et al. | |
| 5,183,522 | 2/1993 | Arima | 156/244.18 |
| 5,190,338 | 3/1993 | Yada | 264/40.7 |
| 5,229,054 | 7/1993 | Yada et al. | 264/167 |
| 5,240,664 | 8/1993 | Hayashi et al. | 264/167 |

FOREIGN PATENT DOCUMENTS

| 58-205746 | 11/1983 | Japan | 264/177.17 |
| 59-106947 | 6/1984 | Japan | 264/210.2 |
| 61-138710 | 8/1986 | Japan | |
| 63-93619 | 4/1988 | Japan | 264/167 |
| 1153325 | 6/1989 | Japan | |

Primary Examiner—Jeffery Thurlow
Attorney, Agent, or Firm—Cushman, Darby & Cushman

[57] ABSTRACT

A manufacturing method and apparatus therefor for forming an elongate body such as a window molding for automobiles in which a thin member H is formed by pressing a thick member V by a press roller 4. The press roller 44 presses the thick member at a definite pressure in order to join an outer support 15 and a head 12V of the window molding by a specified length according to a longitudinal position. At the same time, a moving range for pressing of the press roller 44 is set within a fixed range.

4 Claims, 25 Drawing Sheets

MANUFACTURING METHOD AND APPARATUS FOR FORMING AN ELONGATE BODY HAVING THICKNESS CHANGE

BACKGROUND OF THE INVENTION

1. Field of the Invention

This invention relates to a manufacturing method and apparatus for forming an elongate body having thickness change such as a window molding and the like, and particularly applicable to a manufacturing method and apparatus for forming a window molding for automobiles that has vertical members molded into a section different from that of a horizontal member.

2. Description of Related Art

A convention window molding for automobiles is shown in FIG. 22 to FIG. 25.

In the figures, the window molding is composed of a pair of vertical members V and a horizontal member H molded of a synthetic resin material. The vertical members V are respectively fitted into gaps between right and left edges of a front window glass 1 and a window frame 2. The vertical members V have their heads 151 protruded higher than a head 161 of the horizontal member H from the front surface of the window glass 1. Thus, rainwater swept by a wiper is prevented from overflowing into a side window 3. Further, each head 151 of the vertical member V has a guide groove 152 at its glass side so as to drain the rainwater downward along the right and left edges of the window glass 1. On the other hand, the head 161 of the horizontal member H has substantially a plate-like shape in consideration of aerodynamic characteristics. Namely, it is smoothly continuous from the front surface of the window glass 1 to an upper surface 2a of the window frame 2 which forms a front margin of a roof 4 of the car body. The heads 151 and 161 of the members H and V respectively have seal lips 153 and 162 at their frame side. The seal lips 153 and 162 are elastically contacted with the upper surface 2a of the frame 2 so as to close the gap between the window glass 1 and the frame 2.

There is proposed a window molding for automobiles that can guide and drain rainwater flowing from a front window or a rear window toward a window frame, as well as rainwater flowing from the frame toward the window, downward along the edges of the window glass, in order to ensure a relatively clear view from the car when it rains. For example, Japanese Laid Open Patent Publication No. 1-153325 discloses this type of window molding. The window molding of the above publication has its vertical members and horizontal member provided with heads substantially of a plate shape which are continuous to the front surface of the window glass. Guide grooves are formed between the heads and a window frame. On the other hand, Japanese Laid Open Utility Model Publication No. 61-138710 shows another window molding for automobiles in which a lip is disposed slantingly from a gap between a rear window glass and a window frame, toward the window frame. In this molding, there are provided two guide grooves, one facing the rear window glass and the other facing the window frame.

These moldings are typically molded by extrusion into an elongate shape in consideration of production costs or the like. Accordingly, it is necessary to manufacture vertical members and a horizontal member separately, and thereafter join the vertical members and the horizontal member via another separately molded joint, in case the vertical members and the horizontal member are formed into different sections. This results in increasing the number of parts and increases production and assembly time, thereby augmenting the manufacturing costs.

Thus, there is a request for a manufacturing method for molding an automobile window molding into a specific section and changing sections of vertical members and a horizontal member thereof.

Generally, there is a technique corresponding to this method that extrudes the window molding into a section of a vertical member and that presses it by a press roller to form a horizontal member thereafter.

However, in case of setting a pressed area on the window molding and changing a shape of the pressed area to make the vertical member and the horizontal member into different sections from an original section of the window molding, desired sections cannot be obtained if there is nonuniformity in the original section thereof at the time of extrusion. In such condition, the horizontal member is partially bulged and may exhibit a poor appearance even if it is intended to form the horizontal member flat and lessen the height thereof.

Moreover, in case of making the horizontal member by controlling pressure of the press roller onto the window molding which is extruded into the section of the vertical member, the window molding is to be cut into a length fitted into the gap between the windshield and the window frame of the car. Thus, it is necessary to cut the molding at each center of the vertical member. However, on that condition, the length of the vertical member will differ in case there is an error in distance to the center of the vertical member. This results in a poor appearance when the molding is assembled to the car.

Thus, when manufacturing the window molding having the vertical member and the horizontal member of different thicknesses, it is required to cut the window molding so as to include the horizontal member as well as a pair of vertical members of the same length. However, it is difficult to automatically measure a length of a thickness changing portion of the window molding which has the vertical members and the horizontal member of different sections and which forms a guiding portion for drainage along a perimeter of the windshield.

A manufacturing method of the window molding will be described below. First, in an extruding step, a synthetic resin is extruded by an extruder (not shown) into the same section as a section of a vertical member V which has an inner support 201 at a lower end, as shown in FIG. 24. Next, in a cooling step, an extruded body is cooled and hardened. In a subsequent cutting step, the body is cut into a constant length including a pair of vertical members V and a horizontal member H, thereby obtaining the primary molded product of FIG. 24. This primary molded product has the same section on its whole length as the vertical member V. The primary molded product has a guide groove 204 between a head 203 and an outer support 202. In an adhesive coating step thereafter, an adhesive is coated on a surface of the guide groove 204 at a portion to be the horizontal member H of the primary molded product. Subsequently, in a pressing step which is carried out in another production line different from the above production line, the head 203 of such portion is pressed downward and collapsed so as to be placed and overlapped closely on the outer support 202. Thereby, as shown in FIG. 25, an automobile window molding is completed as a final molded product which has a horizontal head 203H successively formed between a pair of vertical heads 203V.

However, in this method, the final molded product is completed by another production line including an adhesive coating step and a pressing step, after the primary molded product is obtained in one production line including the extruding step, the cooling step and the cutting step, as described above. Thus, two different production lines are necessary to obtain the final molded product. Therefore, there is room for improvement in view of productive efficiency. Moreover, there is a possibility that the adhesive coated on the guide groove 204 in the adhesive coating step would leak out of the gap between the horizontal head 203H and the outer support 202, which are put on each other in the pressing step, so that an appearance of the final molded product is adversely affected.

SUMMARY OF THE INVENTION

In view of the above, it is an object of the invention to provide a manufacturing method and apparatus for forming an elongate body having thickness change that can easily and exactly provide a height difference between an upper part and a right or left part of a front window glass, thereby reducing production costs.

It is another object of the invention to provide a manufacturing method for forming an elongate body having thickness change that can measure a distance from a thickness changing point of a measured object or the elongate body.

It is still another object of the invention to provide a manufacturing method and apparatus for forming an elongate body having thickness change that enables an inline production and that improves an appearance of a final molded product.

In accordance with one preferred mode of the invention, there is provided a manufacturing method for forming an elongate body having thickness change. In an extruding step, the elongate body of a synthetic resin is extruded into a cross-section that forms a concave between a pair of opposed and separated lips. In a joining step, the elongate body is pressed by a press roller at a definite pressure while a moving range is set therefor within a fixed range, so that the lips are integrally joined at a predetermined length according to a longitudinal position of the lips.

In accordance with another preferred mode of the invention, there is provided an apparatus for forming an elongate body having thickness change. A moving means longitudinally moves an elongate body of a synthetic resin having a cross-section that forms a concave between a pair of vertically opposed and separated lips. A press roller is vertically movable between a pressing position pressing an upper surface of the moving elongate body and a retracted position separated from the upper surface of the elongate body. A loading means moves the press roller to the pressing position at a definite pressure. A regulating means regulates a vertical moving range of the press roller within a fixed range.

Further objects and advantages of the invention will be apparent from the following description, with reference being made to the accompanying drawings, wherein preferred embodiments of the invention are clearly shown.

DETAILED DESCRIPTION OF THE PRESENTLY PREFERRED EMBODIMENTS

Figure 1:
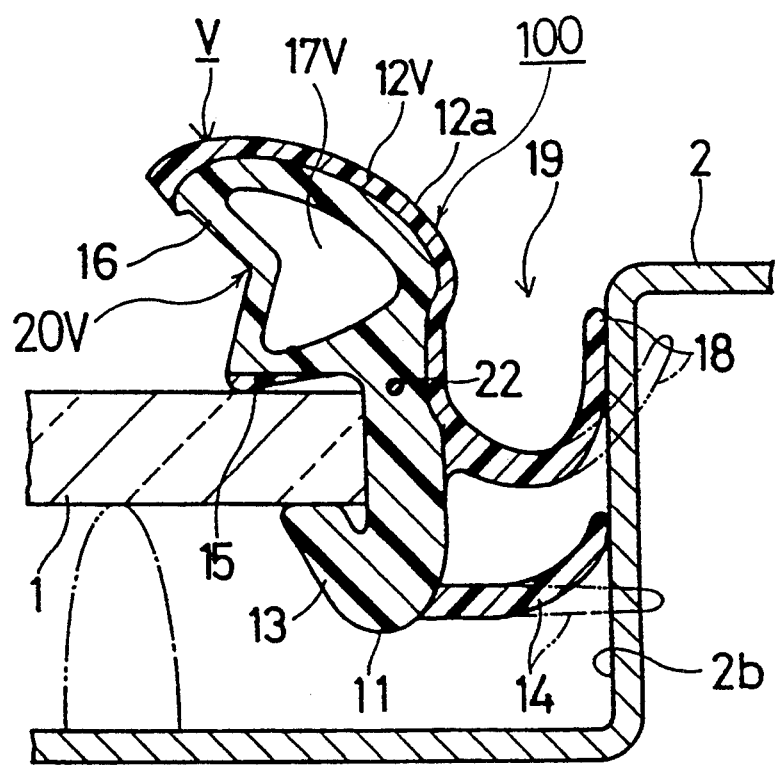
FIG. 1 is a cross-sectional view of a vertical member of a window molding for automobiles obtained by an embodiment of a manufacturing method of the invention for forming an elongate body having thickness change.

Referring to the drawings, wherein like reference characters designate like or corresponding parts throughout the several views, several preferred modes of the invention will be described hereafter. The same reference characters as the prior art designate the same or corresponding parts.

Figure 21:
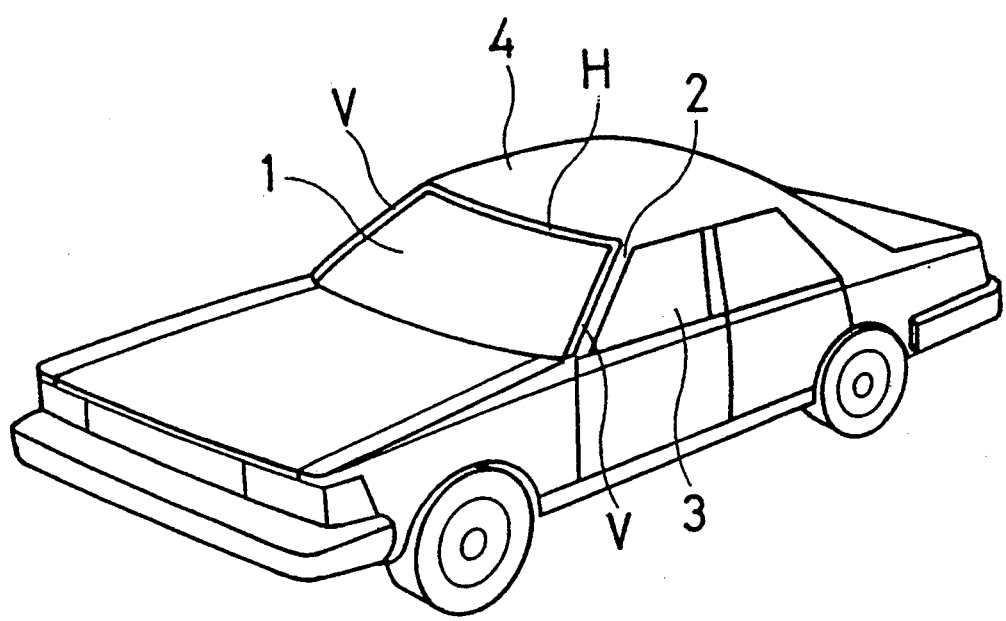
FIG. 21 is a perspective view showing an entire window molding for automobiles fitted in a gap between a windshield and a window frame of an automobile.
Figure 22:
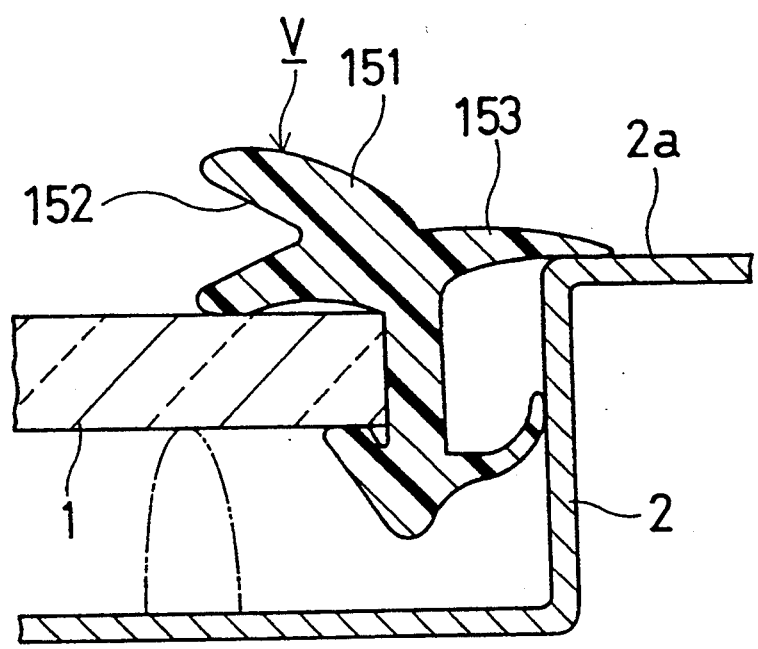
FIG. 22 is a cross-sectional view of a vertical member of a conventional window molding for automobiles.
Figure 23:
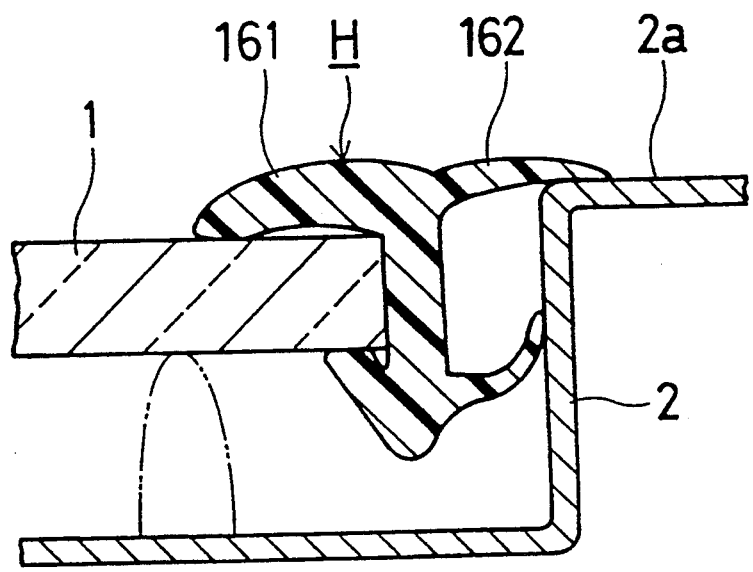
FIG. 23 is a cross-sectional view of a horizontal member of a conventional window molding for automobiles.
Figure 24:
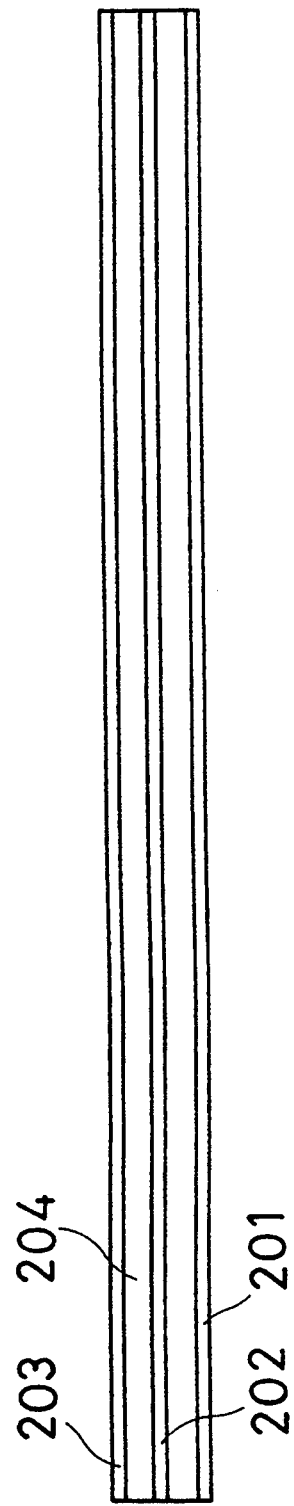
FIG. 24 is a side view showing a primary molded product of a window molding for automobiles obtained by a conventional manufacturing method for forming an elongate body having thickness change.
Figure 25:
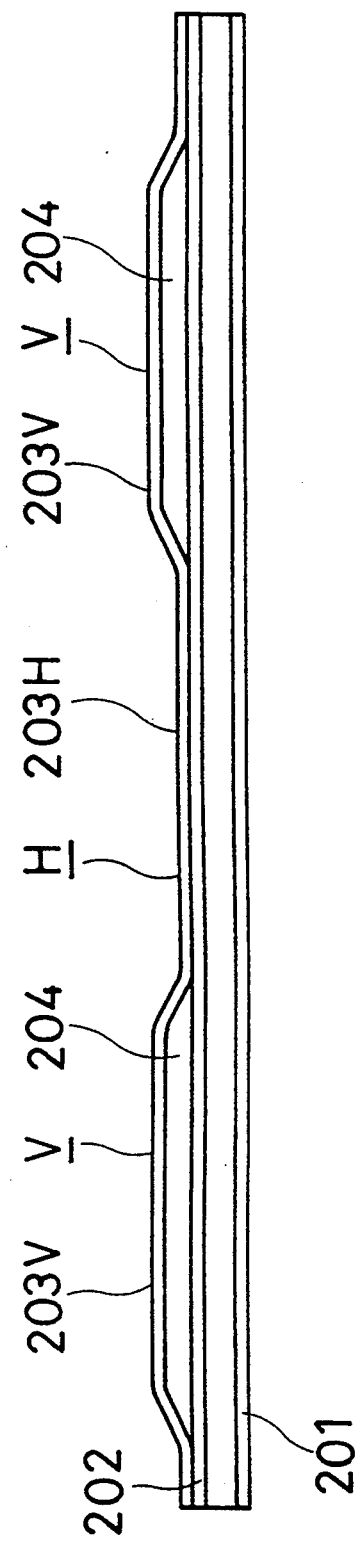
FIG. 25 is a side view showing a final molded product of a window molding for automobiles obtained by a conventional manufacturing method for forming an elongate body having thickness change.

A first embodiment of a window molding for automobiles has, as shown in FIG. 21, a pair of vertical members V and a horizontal member H which are arranged at the right and left and upper edges of the front window glass 1. The members are successively molded of a synthetic resin material by an extruder so that they make one elongate body.

The vertical member V has a standard elongate shape which is integrally made by successively molding the synthetic resin material by the extruder. As shown in FIG. 1, it is composed of a leg 11 and a vertical head 12V as one body. The leg 11 is inserted into the gap between the right or left edge of the front window glass 1 and the window frame 2, while the head 12V faces to a front surface of the right or left edge of the front window glass 1. The leg 11 is provided with an inner support 13 sustaining the rear surface of the window glass 1 and a retaining lip 14 elastically touching the inside surface of the window frame 2. An outer support 15 is formed integrally on the leg 11 opposite the inner support 13. The outer support 15 is contacted with the front surface of the window glass 1. The leg 11, inner support 13 and retaining lip 14 are secured by an adhesive (not shown) to the window frame 2 at the right and left side of the car body. On the other hand, the vertical head 12V of the vertical member V has a shape facing and covering the outer support 15 from an upside. The vertical head 12V has an outer surface as a design surface seen from the outside in an assembled state to the front window glass 1.

A folding piece 16 is molded integrally and successively between a lateral leading end (a glass side end) of the outer support 15 and a lateral leading end of the vertical head 12V, so as to constitute a glass side guide groove 20V. The folding piece 16 is bent inwardly of the vertical head 12V so as to be able to adjust a projecting degree or a height of the vertical head 12V from the surface of the window glass 1 by properly changing a folding angle of a corner thereof. The folding piece 16 bends as the glass side guide groove 20V is extended along the right or left edge of the window glass 1 and opens toward the window glass 1 at the glass side of the vertical head 12V. The vertical head 12V, the outer support 15 and the folding piece 16 define a cavity 17V of a predetermined closed section at the frame side of the vertical head 12V.

A seal lip 18 is successively formed on the frame side of the leg 11 at a position lower than the vertical head 12V. The seal lip 18 has an upper surface stepped relative to the design surface of the vertical head 12V. Thus, the upper surface thereof is seen as a design surface when the window molding is assembled. The seal lip 18 defines a conduit 19 at a frame side of the vertical head 12V. The conduit 19 has substantially a channel section that is opened upward, and is extended along the right or left edge of the window glass 1. There is provided a surface layer of the same soft synthetic resin material from the design surface of the vertical head 12V to the design surface of the seal lip 18. Thus, the surface layer exhibits a single design surface of uniform texture.

Figure 2:
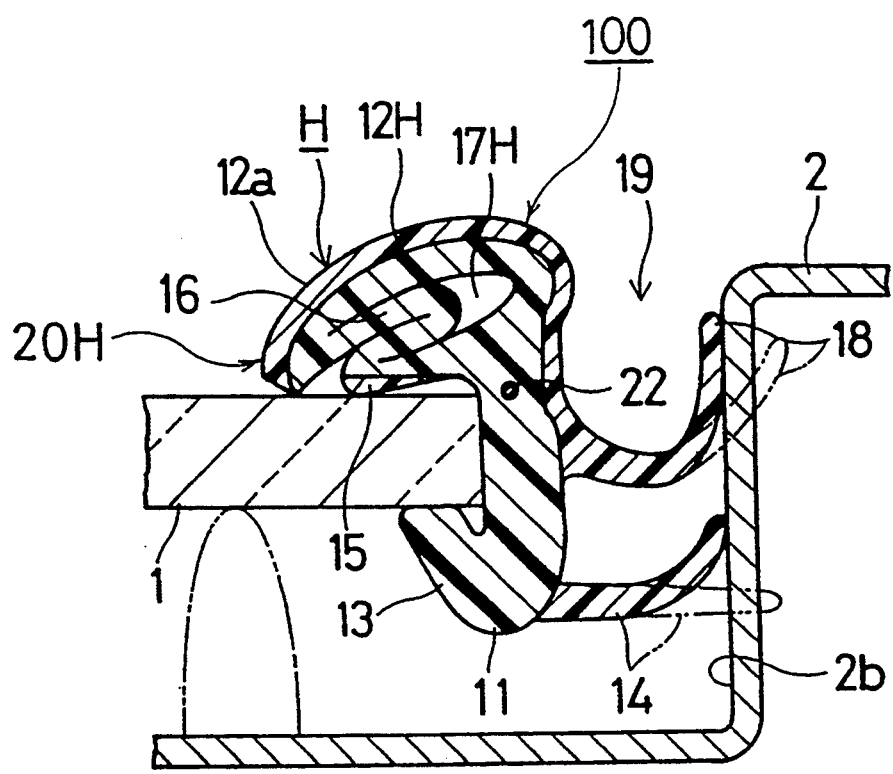
FIG. 2 is a cross-sectional view of a horizontal member of a window molding for automobiles obtained by an embodiment of a manufacturing method of the invention for forming an elongate body having thickness change.

On the other hand, as shown in FIG. 2, a horizontal member H is composed of a leg 11 and a horizontal head 12H as one body. The leg 11 is inserted into the gap between the upper edge of the window glass 1 and the window frame 2, while the head 12H is situated facing the outer surface of the upper edge of the front window glass 1. The leg 11 of the horizontal member H has like structure as the leg 11 of the vertical member V, and is provided with an inner support 13, a retaining lip 14 and an outer support 15. The leg 11, inner support 13 and retaining lip 14 are fixed by an adhesive to the window frame 2 at the front edge of the roof 4 of the car body.

The horizontal head 12H is obtained by pressing and deforming an extruded body of the same shape as the vertical head 12V in its thickness direction, just after extrusion. Namely, the horizontal head 12H is faced to the outer support 15 at a nearer position than the vertical head 12V. The folding piece 16 of the vertical member V is folded at its corner to be overlapped between the leading ends of the outer support 15 and the horizontal head 12H, thus making up a deformed glass side gutter 20H. That is, the deformed horizontal head 12H, the outer support 15 and the folding piece 16 are piled up on each other on the window glass 1. Accordingly, there is formed no guide groove at the glass side of the horizontal head 12H while the glass side guide groove 20V is defined by the folding piece 16 in respect of the vertical head 12V. Thus, there is provided only a deformed cavity 17H at the frame side of the horizontal head 12H by the deformed horizontal head 12H, the outer support 15 and the deformed glass side gutter 20H. The deformed cavity 17H has a closed section smaller than, and different from, the section of the cavity 17V of the vertical head 12V.

Thereby, the upper surface, as the design surface of the horizontal head 12H, is positioned lower than the upper surface, as the design surface of the vertical head 12V, in relation to the window glass 1. The present embodiment of the window molding makes a height of a boundary part of the heads 12V and 12H changed relative to the window glass 1. Namely, the height varies gradually from a height of the vertical head 12V to a height of the horizontal head 12H so as not to produce a line of discontinuity at a boundary part.

A seal lip 18 is successively formed on the frame side of the leg 11 at a position lower than the horizontal head 12H, as in the vertical head 12V. The seal lip 18 has an upper surface as a design surface stepped relative to the design surface of the horizontal head 12H and seen when the window molding is assembled. The seal lip 18 defines a conduit 19 substantially of a channel section which extends along the upper edge of the window glass 1 and which is opened upward, at the frame side of the horizontal head 12H. Thus, the conduit 19 is extended along a full length of the vertical heads 12V and the horizontal head 12H at the frame side of the members V, H. In the illustrated embodiment, a surface layer of the same soft synthetic resin material constitutes a single design surface of uniform texture from the design surface of the horizontal head 12H to the design surface of the seal lip 18.

Referring to FIGS. 1 and 2, a metal wire 22 is embedded through the vertical and horizontal members V and H for the purpose of reinforcement as well as prevention of contraction. In the illustrated example, a soft synthetic resin material makes up a lower part of the leading end of the outer support 15 which touches the window glass 1, the retaining lip 14, the seal lip 18 and the above-mentioned surface layer over the design surfaces from the heads 12V and 12H to the seal lip 18. The other part of the leg 11 and the heads 12V and 12H are formed of a hard synthetic resin material by a simultaneous extrusion with the soft synthetic resin material. Otherwise, the window molding may be made of a soft synthetic resin material, for example, at least at a part or all of the contact surfaces touched with the window glass 1 or the window frame 2, while the other part being made of a hard synthetic resin material.

Hereunder explained is a manufacturing process of the first embodiment of the window molding for automobiles as constructed above.

Figure 3:
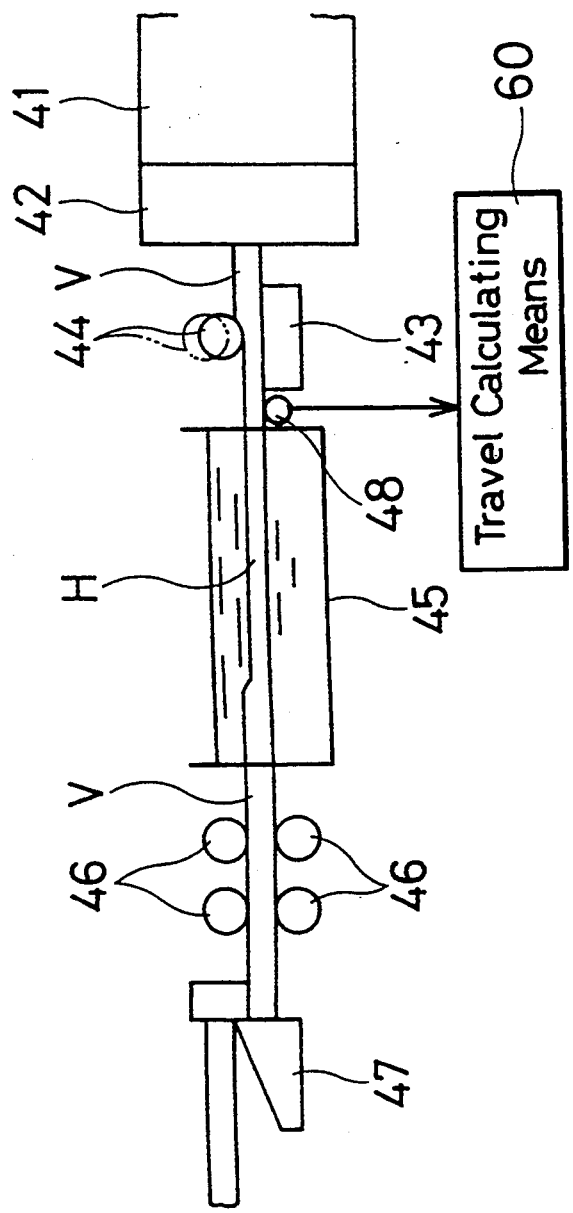
FIG. 3 is a schematic side view of a manufacturing apparatus used in a first embodiment of a manufacturing method of the invention for forming an elongate body having thickness change.

As shown in FIG. 3, there are arranged a jig 43 and a press roller 44 near an extrusion head 42 of an extruder 41. The press roller 44 is controlled to move between an upper position shown by a tow-dot chain line and a lower position shown by a solid line in the figure. The press roller 44 is retracted to the upper portion when the vertical members V are extruded from the extrusion head 42. Thus, the vertical members V are molded into the same shape as an extruding shape of the extrusion head 42, namely into a shape of a cross-section shown in FIG. 1. On the other hand, the press roller 44 is advanced to the lower position when the horizontal member H is extruded from the extrusion head 42. Thus, the horizontal head 12H is pressed down by the press roller 44 while being in a hot and softened state just after the extrusion. The jig 43 and the press roller 44 used as above, constitute part of a press forming machine 50 of the present embodiment.

At this time, the cavity 17V inside the vertical head 12V of the window molding permits deformation of the head 12V. Consequently, the horizontal member H is made into a cross-section shown in FIG. 2, so that the horizontal head 12H is provided with the deformed cavity 17H which has the section smaller than, and different from, the section of the cavity 17V of the vertical head 12V. At the same time, the folding piece 16 is bent at the corner so as to have the outer surface overlapped, thereby making the deformed glass side gutter 20H and being piled up on the outer support 15.

A molded product which has passed the jig 43 and the press roller 44 is next transferred to a cooling water tank 45, and cooled and hardened so as to be kept in each shape as described above. Subsequently, the molded product is pulled out by drawing rollers 46 and conveyed to a cutter 47 so as to be cut apart into a predetermined length, namely a total length of the right, left and upper edges of the front window glass 1.

Figure 4:
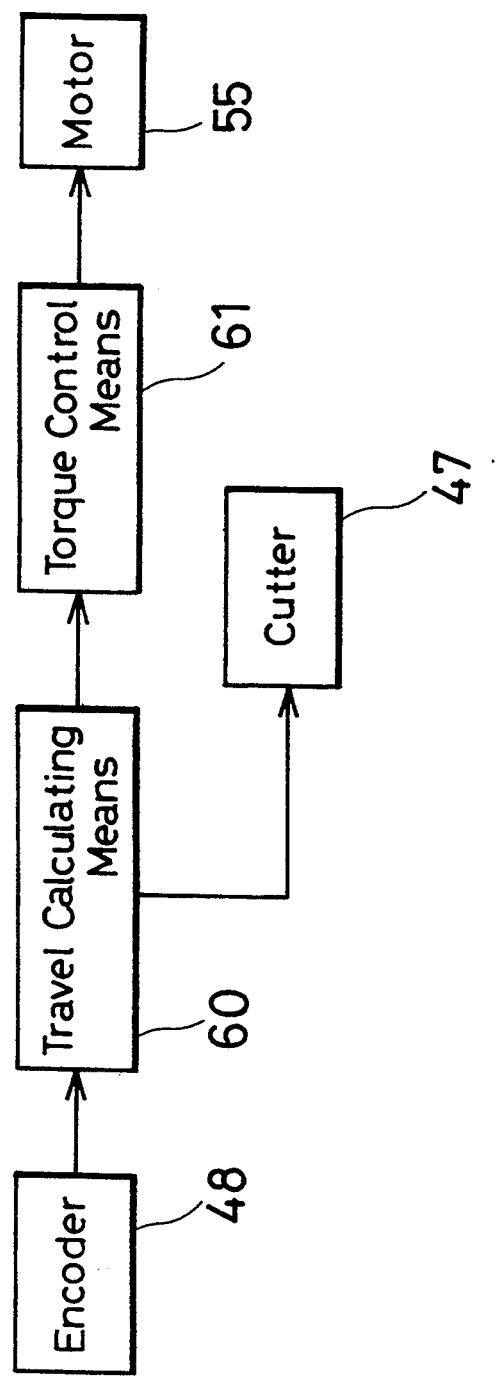
FIG. 4 is a schematic diagram of a control circuit of a first embodiment of a manufacturing apparatus of the invention.

An encoder 48 is contacted and rotated with the leg 11 of the window molding as extruded above, as shown in FIG. 4. Output of the encoder 48 is inputted into a travel calculating means 60 according to rotation of the encoder 48. The travel calculating means 60 calculates a moving distance of the window molding and operates the cutter 47 to cut it by a specified length when a calculated value becomes the specified length.

As shown in FIG. 4, a torque control means 61 is driven when the travel distance of the window molding reaches a specified value, which is calculated by the travel calculating means 60 according to the rotational output of the encoder 48. Thus, the height of the window molding is changed gradually from the height of the vertical head 12V to the height of the horizontal head 12H or vice versa, or pressing condition of the horizontal head 12H is controlled.

Figure 5:
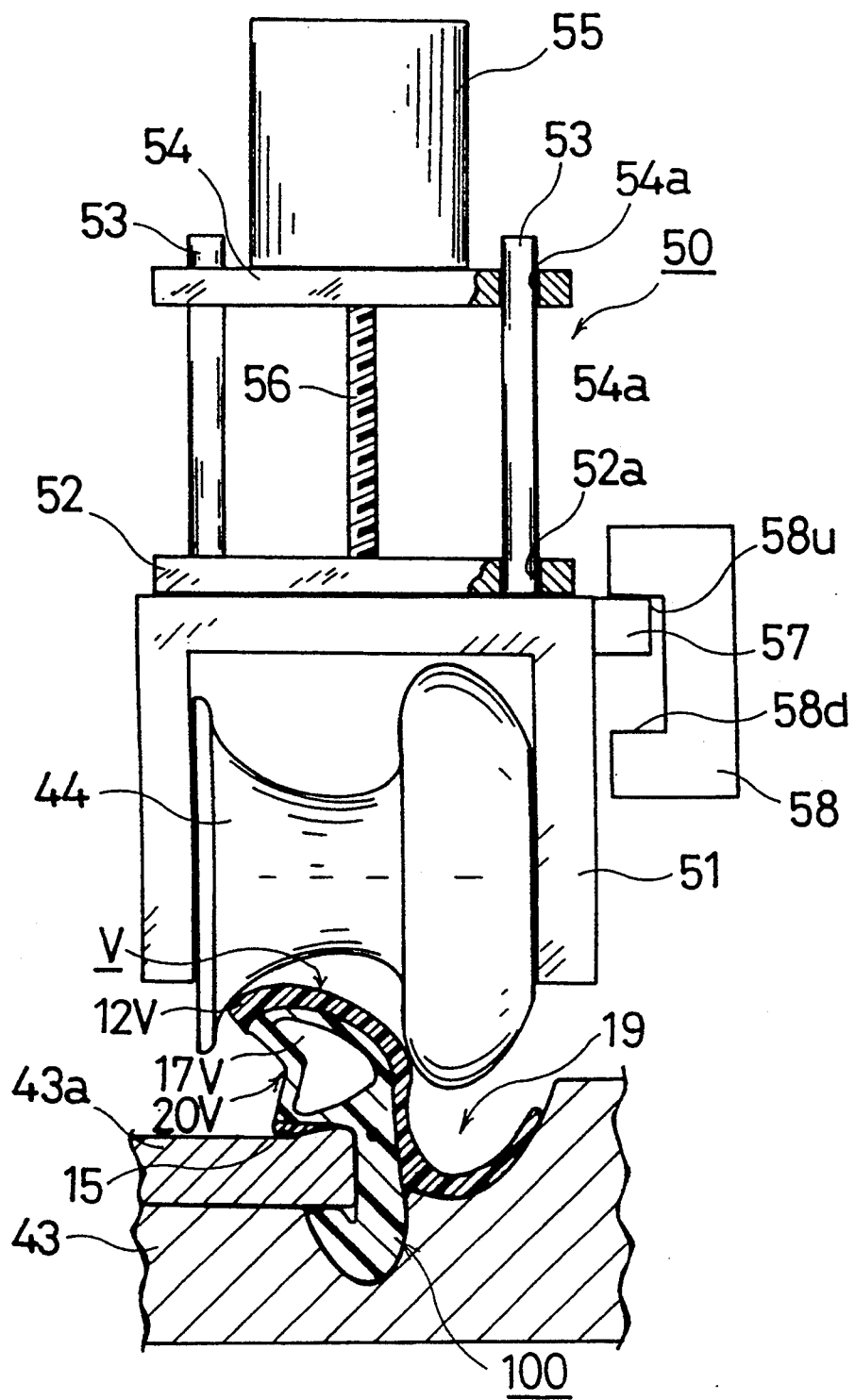
FIG. 5 is an explanation view showing a releasing state of a press forming machine used in a first embodiment of a manufacturing method of the invention.
Figure 6:
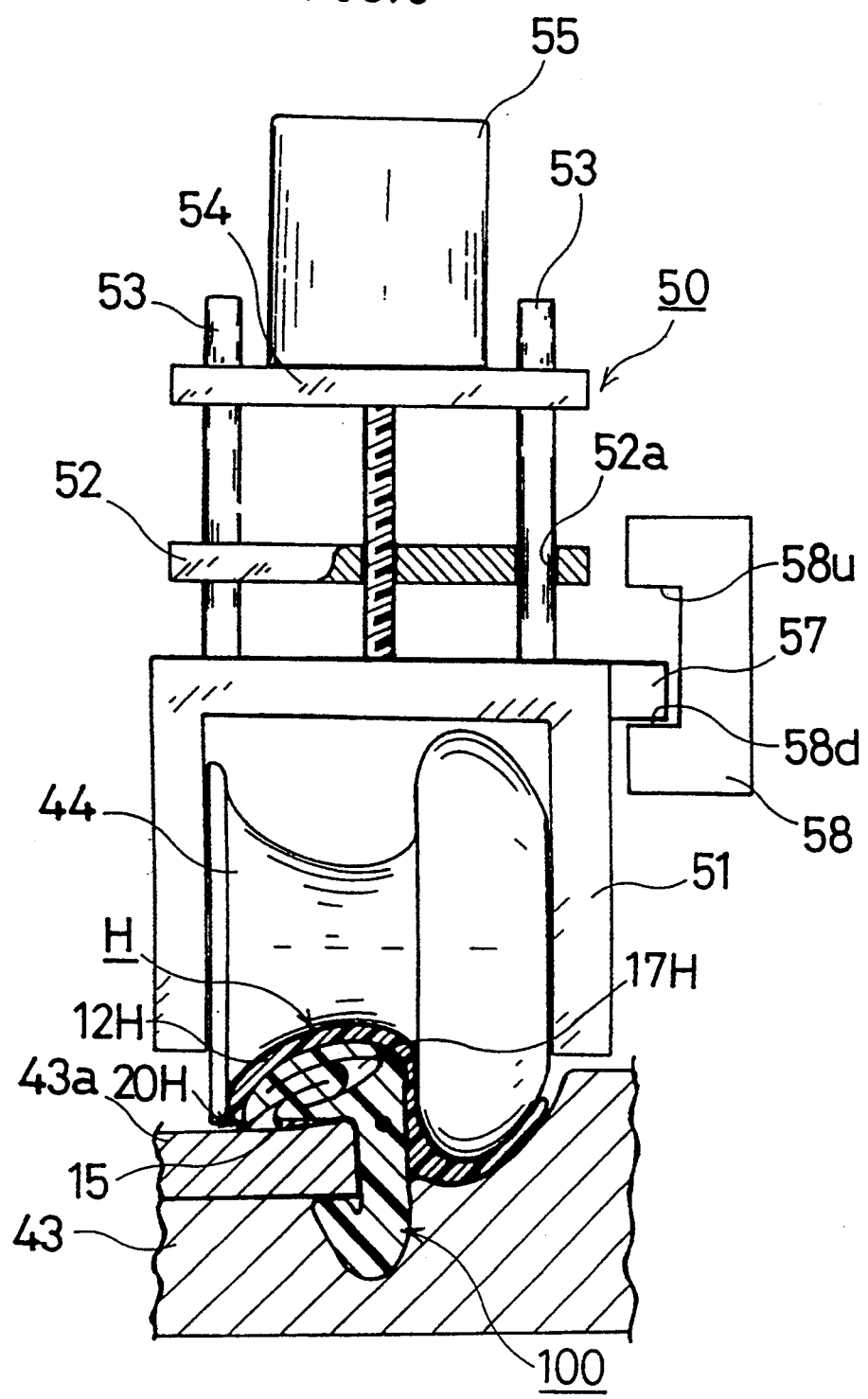
FIG. 6 is an explanation view showing a pressing state of a press forming machine used in a first embodiment of a manufacturing method of the invention.

Referring to FIGS. 5 and 6, the press roller 44 of the press forming machine 50 has an outline as a section crossing its center axis similar to a section of the design surface of the leg 11 or the like of the horizontal member H. The press roller 44 has a shaft rotatably borne on a support 51 substantially of a channel section. Two guiding rods 53 are fixed on an upper part of the support 51 so that the support 51 is restrained from rotation relative to a body mount 52 which is attached to a main body. The two guiding rods 53 are respectively inserted into through holes 52a of the machine body 52, and move up and down along the through holes 52a so as to block the rotation of the machine body 52. A motor mount 54 is disposed on the guiding rods 53 in parallel with the body mount 52. A motor 55 is arranged on the motor mount 54. The motor mount 54 also has through holes 54a, which permit the motor 54 to move up and down along the guiding rods 53 and which hinder the motor mount 54 from rotation. An output shaft 56 of the motor 55 has a ball thread at its one end portion. The ball thread of the output shaft 56 is screwed into the body mount 52. The output shaft 56 has the other end portion supported rotatably on the upper part of the support 51.

A stopper 57 is protruded integrally from a lateral side of the support 51. The stopper 57 is contacted with a regulating block 58 which is attached to the main body. The regulating block 58 has an upper limiter 58u to restrict lifting of the stopper 57 and a lower limiter 58d to restrict lowering of the stopper 57. Thus, the regulating block 58 limits a moving range of the stopper 57, namely a moving range of the press roller 44. The stopper 57 and the regulating block 58 serve as means for setting a permitted moving range in pressing of the press roller 44 of the present embodiment.

The jig 43 has a guide 43a for positioning a gap between the inner support 13 and the outer support 15 of the window molding. In the present embodiment, the position of the gap between the supports 13, 15 is used as a reference position of the window molding.

The motor 55 herein used is one which is controlled at a constant torque or one which has a constant torque output property.

Accordingly, in the present embodiment, the press roller 54 of the press forming machine 50 presses the horizontal member H of the window molding always at a specified constant torque by the motor 55. In this pressing at the constant torque, the press roller 44 has its moving range restricted by the regulating block 58, namely by the upper limiter 58u limiting the rise of the stopper 57 and the lower limiter 58d limiting the fall of the stopper 57. Thus, the pressing work of the press roller 44 is controlled at the constant torque within the moving range.

That is, as shown in FIG. 4, the revolution or the rotational output of the encoder 48 is proportional to the extruded length of the window molding. The output is inputted into the travel calculating mean 60, which calculates the moving distance of the window molding. When the moving distance reaches the specified value, the torque control means 61 is driven and the pressing force is increased step by step so that the window molding has its shape changed from the vertical head 12V to the horizontal head 12H. Namely, the pressing force is controlled so that the height of the vertical head 12V various gradually to the height of the horizontal head 12H. The press roller 44 is controlled at the constant torque for a distance corresponding to the horizontal head 12H.

Here, if there is a fear that the window molding be injured by a moving distance detecting means using the encoder 48, it is preferable to use a non-contact type detector or a laser doppler type detector as the moving distance detecting means.

Then, the press roller 44 is displaced from the position of FIG. 5 to the position of FIG. 6. Here, the head of the molding (vertical head 12V) is in a softened state just after extrusion from the extrusion head 42. The head is squashed by the press roller 54 so that the horizontal member H is molded into the section shown in FIG. 2 and FIG. 6, since the cavity 17V of the vertical member V permits deformation of the vertical head 12V. As a result, the horizontal member H is provided with the deformed cavity 17H which has a section of smaller size and different shape as compared with the cavity 17V of the vertical member V. At the same time, the folding piece 16 of the horizontal member H is bent at the corner so that the outer surface is overlapped to make the deformed glass side gutter 20H and piled up on the outer support 15.

The window molding, as molded above, is transported in the car production line and fitted into the gap between the window glass 1 and the window frame 2 of the car body. In this case, the legs 11 of the members V and H are successively inserted into the gap between the right and left and upper edges of the window glass 1 and the window frame 2. Then, they are secured to the window frame 2 by an adhesive. Thus, as shown in FIG. 1, the vertical heads 12V are disposed on the right and left edges of the window glass 1, while projected high from the front surface thereof. Each vertical head 12V has the seal lip 18 elastically touched with the inner surface of the window frame 2 so as to cover the gap and define the conduit 19 together with the window frame 2. On the other hand, as shown in FIG. 2, the horizontal head 12H is disposed on the upper edge of the window glass 1, while being protruded low from the front surface thereof. The horizontal head 12H has the seal lip 18 elastically touched with the inner surface of the window frame 2 so as to cover the gap. Thus, the seal lip 18 and the window frame 2 define a conduit 19 which is continuous with the conduit 19 of the vertical members V.

While the above-described window molding is fitted into the gap between the glass 1 and the frame 2 in the car production line, it is possible that the window molding be mounted on the window glass 1 first, and that the above-combined parts be transported into the car production line thereafter and assembled to the car body by an automatic assembly machine.

A second embodiment of the invention will be described hereafter. The second embodiment of the window molding is similar to the first embodiment and composed of vertical members V and a horizontal member H which are successively molded of a synthetic resin material by an extruder so that they make one elongate body.

Figure 7:
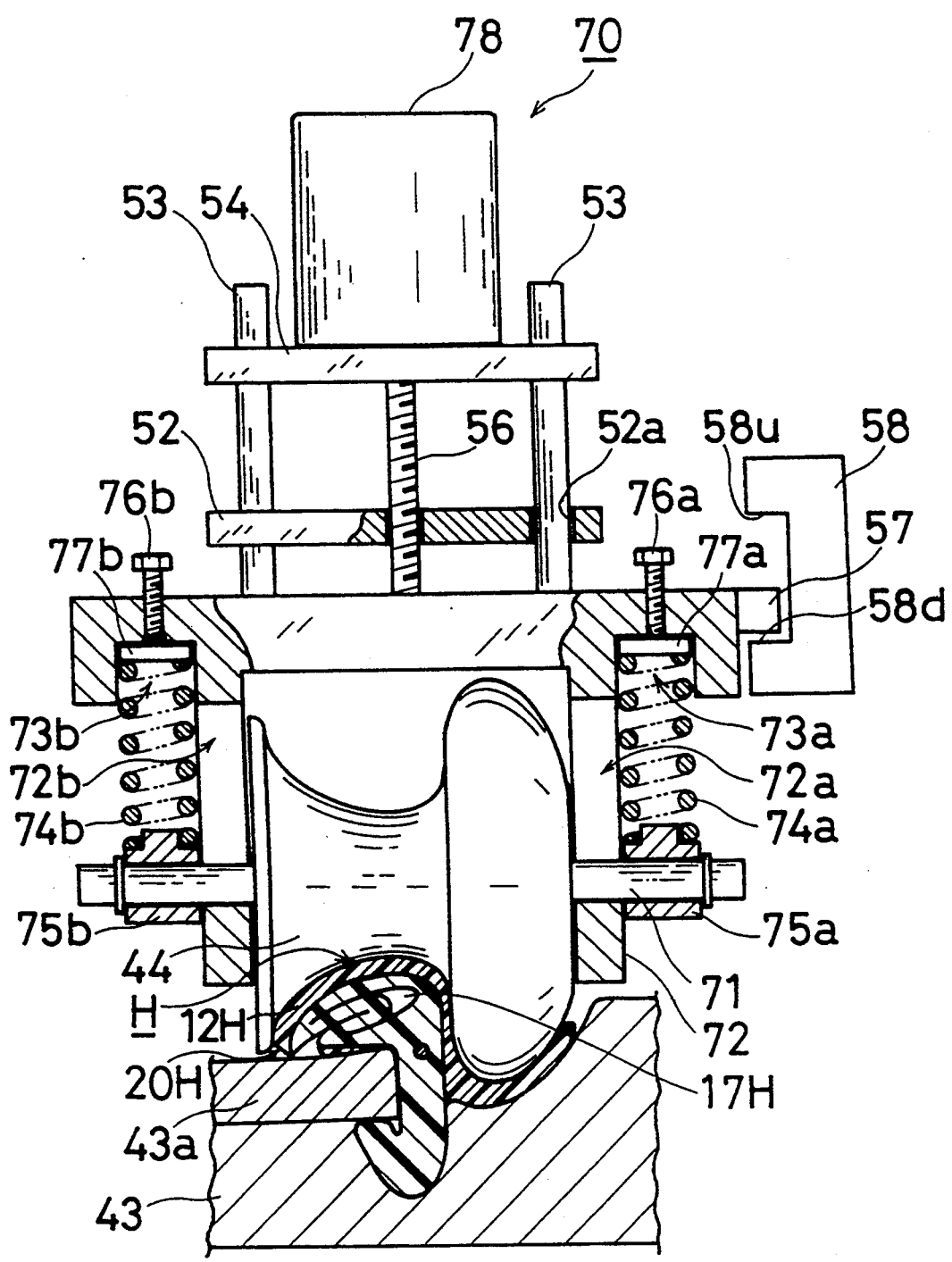
FIG. 7 is an explanation view showing a pressing state of a press forming machine used in a second embodiment of a manufacturing method of the invention.

Referring to FIG. 7, a press forming machine 70 has a press roller 44 which has an outline as a section crossing its center axis similar to a section of the design surface of the leg 11 or the like of the horizontal member H. The press roller 44 is rotatably supported by a shaft 71. The shaft 71 is inserted into vertically extending slits 72a and 72b of a support 72 substantially of a channel section, so that it can move vertically through the slits 72a, 72b. Fitting recesses 73a and 73b are formed on lateral sides of the support 72 and accommodate therein springs 74a and 74b. Spring seats 75a and 75b are disposed at opposite ends of the shaft 71. The springs 74a and 74b are arranged between the fitting recesses 73a, 73b and the spring seats 75a, 75b and give a resilient force in a direction widening a space therebetween. The spring seats 75a, 75b are fixed by O-rings so as not to drop out of the opposite ends of the shaft 71. Adjusting screws 76a and 76b are rotated to change positions of contact plates 77a and 77b which are disposed at ends of the springs 74a, 74b, thereby to adjust the resilient force of the springs 74a, 74b between the recesses 73a, 73b and the seats 75a, 75b. Namely, the resilient force of the springs 74a, 74b is varied by the rotation of the adjusting screws 76a, 76b, so that it is possible to vary the pressing force applied to the window molding by the press roller 44. Here, the adjusting screw 76a or 76b can be rotated to independently change the resilient force of the spring 74a or 74b, so that the press roller 44 of the present embodiment is able to increase the pressing force at one axial side.

The present embodiment also has two guiding rods 53 secured to an upper part of the support 72 so as to restrict rotation of the support 72 to the body mount 52, which is fitted to the main body. Moreover, the motor mount 54 sustains a motor 78 while being arranged on the guiding rods 53 in parallel with the body mount 52. The output shaft 56 has one end away from the motor 78 fitted rotatably on the upper part of the support 72.

The motor 78 of the present embodiment is a position control motor like a pulse motor and controls a stop position of the support 72 according to signals given from an external device.

Therefore, in the present embodiment, the press roller 44 of the press forming machine 70 can make its pressing resilient force constant to the horizontal member H of the window molding, through the expansion springs 74a, 74b disposed on the support 72, if the position of the support 72 is controlled via the motor 78 within a specified moving distance of the window molding. In this equalizing of the pressure, since the regulating block 58 restricts the moving range of the stopper 57 through the upper limiter 58u and the lower limiter 58d, the press roller 44 is controlled at a constant pressure within that moving range.

As described above, in the present embodiment of the manufacturing method of the window molding, the press roller 44 is pressed at the constant pressure using the predetermined torque control shown in FIGS. 5 and 6, or using the predetermined resilient force control shown in FIG. 7. Moreover, the permitted moving range, in pressing of the press roller 44 to the window molding, is set by the support 57 and the regulating block 58. Thus, the vertical head 12V is integrally joined to the outer support 15 for a fixed length according to the peripheral portion of the front window glass 1, thereby making up the deformed glass side gutter 20H composed of the horizontal head 12H.

Accordingly, in the case of forming the horizontal head 12H, the press roller 44 can be pressed at the constant pressure by the predetermined torque control or the predetermined resilient force control, so that the joining pressure of the vertical head 12V and the outer support 15 can be made constant. Since it is possible to make up the horizontal head 12H while making complete a joined condition of the horizontal head 12V and the outer support 15, the horizontal head 12H never rises in its use.

If the joining pressure to the vertical head 12V and the outer support 15 is controlled, e.g. only by a distance, it is supposed that a lowering position of the press roller 44 may be excessive, or that a specified joining pressure cannot be obtained due to influences of molding errors in the thicknesses of the vertical head 12V and the outer support 15 or the like, in case of forming the horizontal head 12H. In this case, the ends of the vertical head 12V and the outer support 15 are excessively collapsed. As a result, there will arise a distortion in the outline of the deformed glass side gutter 20H composed of the horizontal head 12H, or an appearance thereof will be affected. Otherwise, it is supposed that the vertical head 12V and the outer support 15 are not joined completely, so that the vertical head 12H rises in its use. However, with the present embodiment, such troubles can be overcome reliably owing to the pressure control.

Moreover, since the permitted moving range, in pressing the molding, is set by the stopper 57 and the regulating block 58, the press roller 44 is pressed at the constant pressure by the specified torque control or resilient force control so as to join the vertical head 12V and the outer support 15. Accordingly, the press roller 44 deviates from the range of the constant torque control or the constant resilient force control, in case the thickness of the vertical head 12V or the outer support 15 lessens or becomes extraordinarily large. Thus, such window molding can be eliminated as defective products, so severe quality control is possible. Especially, in case of forcedly excluding the defective window moldings, a proximity switch, like a limit switch, is arranged at contact positions of the stopper 57 and the regulating block 58. Thus, it is made possible to detect defectiveness and control exclusion, by action of the proximity switch.

The above embodiment of the manufacturing method for the window molding is explained with respect to the window molding having the leg 11 which is successively fitted into the gap between the front window glass 1 and the window frame 2 and which has the inner support 13 formed on its lower part, the outer support 15 sandwiching the window glass 1 together with the inner support 13, and the heads which are formed successively on the leg 11 and which includes the vertical head 12V and the horizontal head 12H exposed from the gap between the window glass 1 and the window frame 2. However, the present invention may be concretized into any window molding comprising: the outer support 15 successively fitted into the gap between the window glass 1 and the window frame 2 and holding the window glass 11 with the inner support 13, and the vertical heads 12V exposed from the gap between the window glass 1 and the window frame 2, wherein the vertical head 12V is deformed by pressing of the press roller 44 into the horizontal head 12H.

In the present embodiment of the manufacturing method for the window molding, the window molding has a gap between the vertical head 12V and the outer support 15, the gap defining the glass side guide groove 20V. The press roller 44 is pressed at a constant pressure by a predetermined torque control or resilient force control. The output shaft 56, having the ball thread, is used for the pressing work. However, the invention may be embodied so that the axis of the press roller 44 is de-centered to adjust the pressing force according to a rotated angle or decentered degree of the axis. Namely, in concretizing the invention, it is enough that the press roller 44 has its pressing operation controlled by the constant torque control or the constant resilient force control so as to press, at the constant pressure, the vertical head 12V and the outer support 15 which have the gap forming the glass side guide groove 20V.

Moreover, in embodying the invention, the permitted moving range in pressing of the press roller 44 can be set by the stopper 57 and the regulating block 58 in the constant torque control or the constant resilient force control, thereby removing any products out of a specified range as defective products.

The present invention can be embodied in a following manufacturing process of window molding. For example, it may be one which the press forming machine 50, 70 is controlled in an inline equipment just after the extrusion of the window molding. Or it may be one in which the window molding is cut just after the extrusion and pressed by the constant torque control or the constant resilient force control, simultaneously with heating or after being coated with an adhesive.

Figure 8:
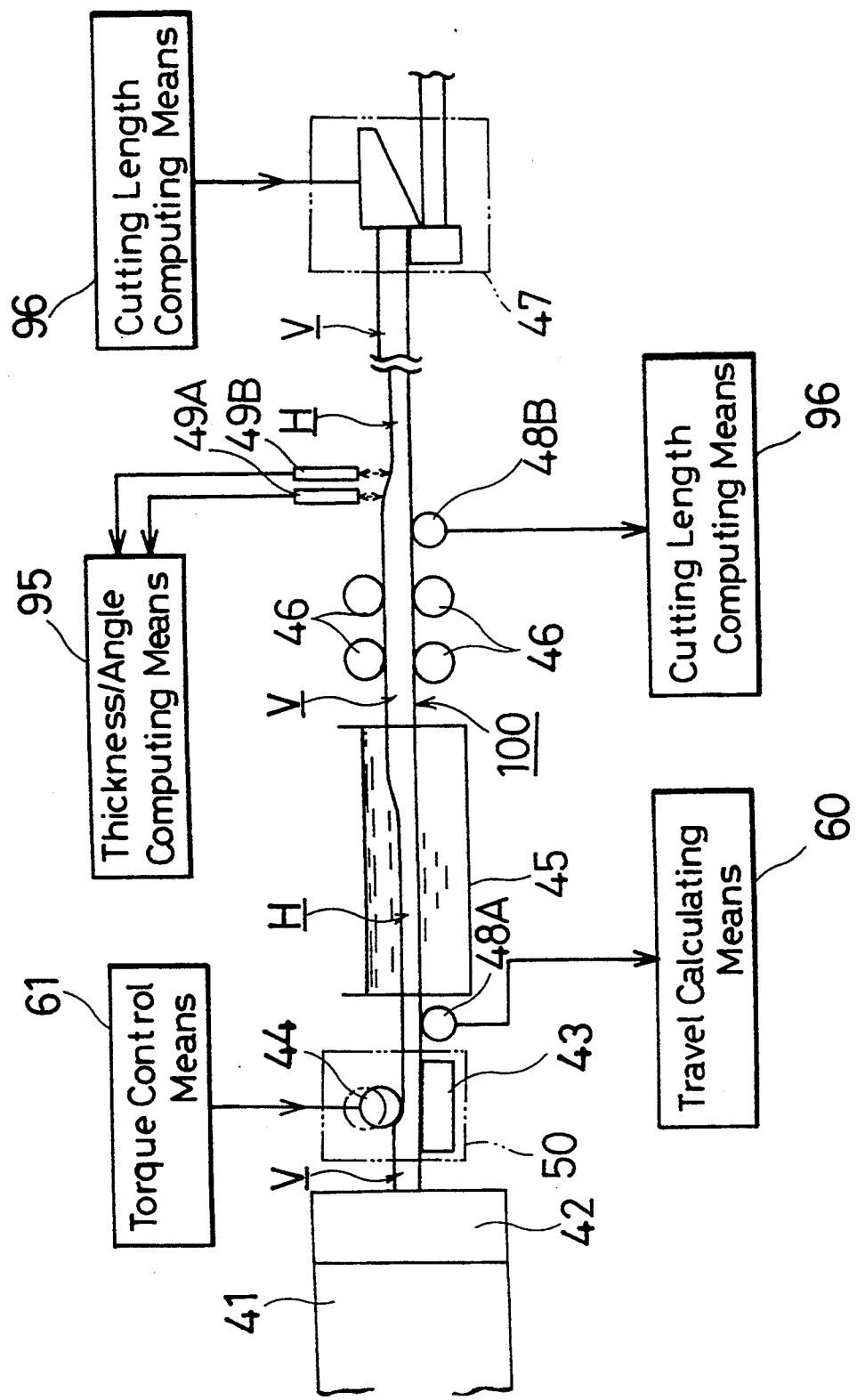
FIG. 8 is a schematic side view of a manufacturing apparatus of a window molding for automobiles used in a third embodiment of a manufacturing method of the invention.

FIG. 8 is an explanation view showing a manufacturing apparatus of a third embodiment of the window molding of the invention. The third embodiment is different from the first and second embodiments mainly in that an encoder 48B and thickness measuring means 49A and 49B are arranged at a lower course of the drawing rollers 46, in addition to an encoder 48A at an upper course of the cooling water tank 45 of the manufacturing apparatus of the first embodiment.

Figure 11:
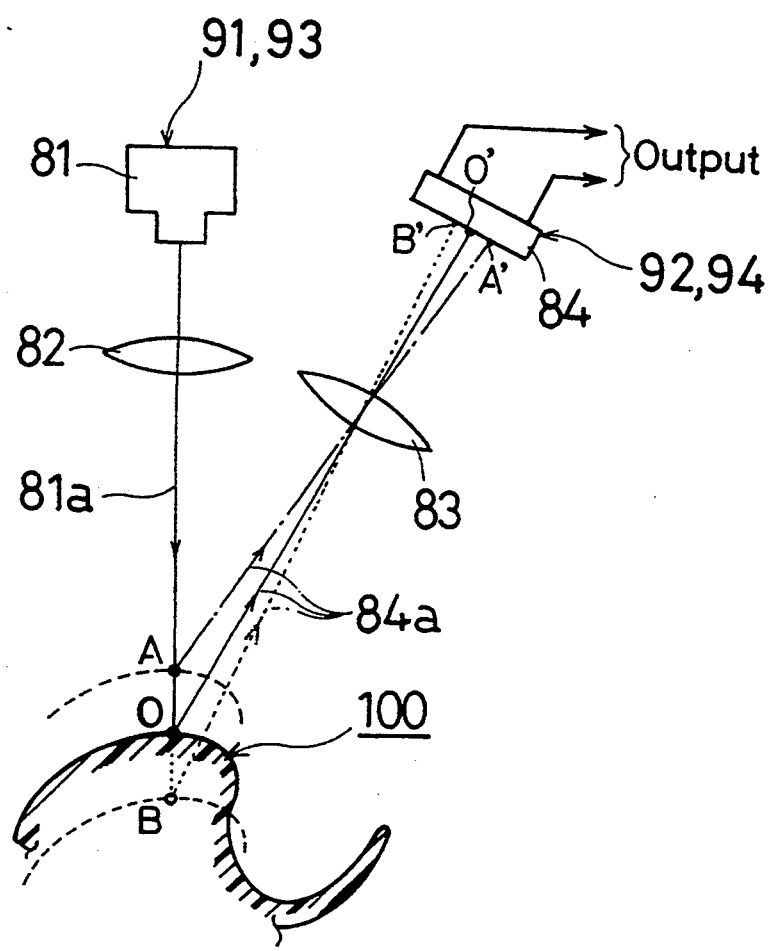
FIG. 11 is an explanation view of a thickness measuring means of a third embodiment of a manufacturing apparatus of the invention.

Namely, the extruded body is hardened into an ordinary product or an extruded product 100 before reaching the cutter 47. A travel distance of the extruded product 100 is measured by the encoder 48B which is contacted and rotated with the leg 11 thereof. The thickness measuring means 49A is disposed at the extruding side and the thickness measuring means 49B is disposed at a cutting side, in order to measure the thickness of the extruded product 100. The thickness measuring means 49A is composed of a light emitting means 93 and a light receiving means 94 as a pair. The thickness measuring means 49B is composed of a light emitting means 91 and a light receiving means 92 as a pair. These pairs appear to be lined in the moving direction of the extruded product 100 in FIG. 9. However, they are actually disposed in such a direction as an optical axis crosses vertically the moving direction of the extruded product 100 in order to minimize a measuring error as shown in FIG. 11. After the extruded product 100 passes the thickness measuring means, the moving distance thereof is measured by the encoder 48B. Subsequently, the extruded product 100 is cut by the cutter 47 into a predetermined length, that is a total length of the right and left and upper edges of the front window glass 1.

The extruded product 100 is pulled out by the drawing rollers 46 after passing the jig 43 and the press roller 44 of the press forming machine 50. Then, the extruded product 100 is sent to the water cooling tank 45 and cooled and hardened, thereby being kept in the above mentioned shape of the fixed section. Further, the extruded product 100 is transferred to drawing and carrying rollers (not shown), thereby rotating the encoder 48B while making the leg 11 contact therewith.

Moreover, the thickness of the extruded product 100 is measured by the thickness measuring means 49A at the side of the extruder 41 and the measuring means 49B at the side of the cutter 47.

The thickness measuring means 49A and 49B are constructed as shown in the explanation view of FIG. 11. The thickness measuring means 49 and 49B are composed respectively of the pair of the light emitting means 93 and the light receiving means 94 and the pair of the light emitting means 91 and the light receiving means 92. Namely, they have the same basic structure. Each pair of light emitting means 93, 91 and light receiving means 94, 92 are arranged so that they radiate a laser beam 81a in a direction crossing rectangularly the moving direction of the extruded product 100 and receive the laser beam 81a at an opposite position.

A semiconductor laser 81 as the light emitting means 93, 91 is disposed vertically to the length of the extruded product 100. It radiates the laser beam 81a through a projector lens 82 to a surface of the extruded product 100. In the present embodiment, the laser beam 81a of coherent light is radiated from the semiconductor laser 81 in order to make an area of an irradiation point small and clear without influences of thickness. However, in concretizing the invention, normal light can be used if there is small change in the thickness of the extruded product 100. An optical position detector 84, which is conventional as a one-dimensional element constituting the light receiving means 92, 94, receives the reflected light through a receiver lens 83.

Providing that, for example, when the upper surface of the extruded product 100 is positioned at an irradiation point 0 due to its thickness, the reflected light is positioned at a detection point O' as a reference position of the optical position detector 84. When the extruded product 100 has a larger thickness, the irradiated position rises to be an irradiation point A, and the reflected light is positioned at a detection point A' of the optical position detector 84. On the other hand, when the extruded product 100 has a smaller thickness, the irradiated position lowers to be an irradiation point B, and the reflected light is positioned at a detection point B' of the optical position detector 84. Thus, it is possible to detect and obtain output as a light spot which moves to a position proportional to the thickness of the extruded product 100, by reading out a position of the light which is imaged or focused on the optical position detector 84.

Here, the thickness measuring means 49A and 49B are separated by a distance L (FIG. 9) in their use so that they take different positions in the longitudinal direction of the extruded product 100. Moreover, they are composed of a pair of light emitting means composed of the semiconductor lasers 81 and a pair of light receiving means composed of the optical position detectors 84 known as the one-directional element, the semiconductor laser 81 radiating the light beam vertically to the longitudinal direction of the extruded product 100, the optical position detector 84 receiving the light irradiated from a pair of light sources to the extruded product 100 and reflected therefrom and detecting the thickness change thereof.

The extruded product 100 is transferred to the cutter 47 and cut to a predetermined length after it passes the thickness measuring means 49A and 49B.

Figure 9:
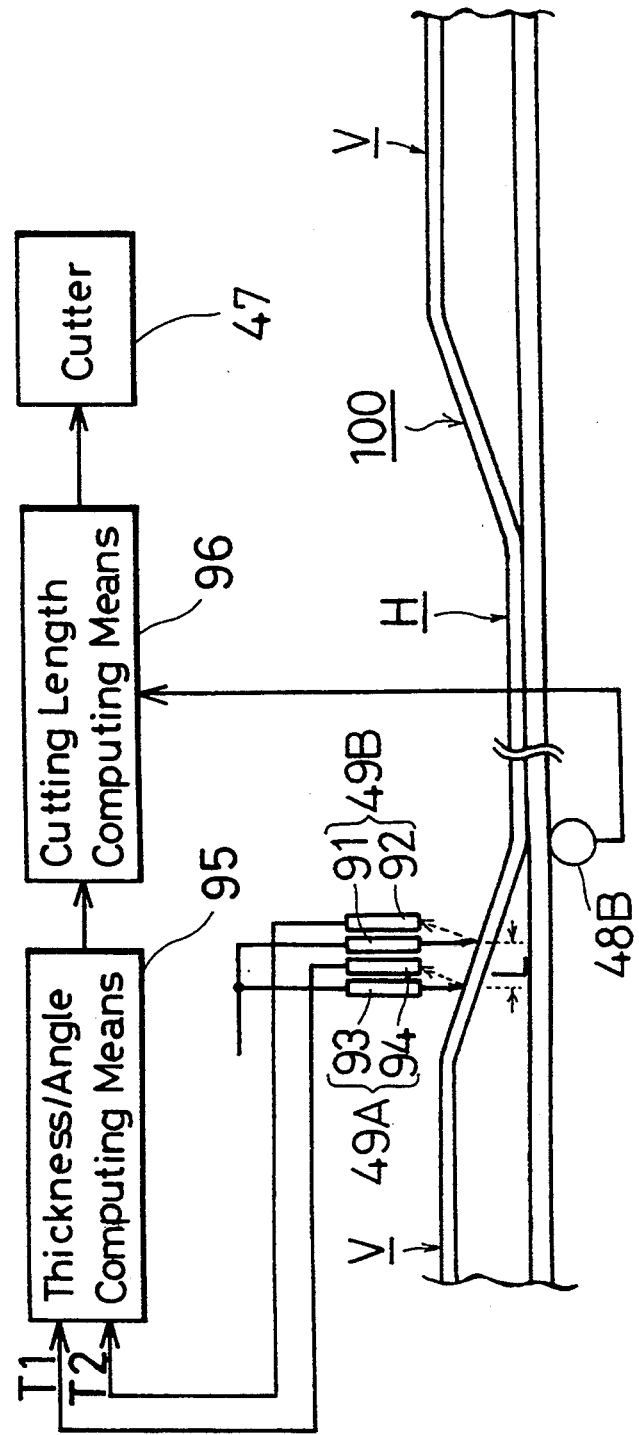
FIG. 9 is a diagram of a control circuit for a cut control system of a third embodiment of a manufacturing apparatus of the invention.
Figure 10:
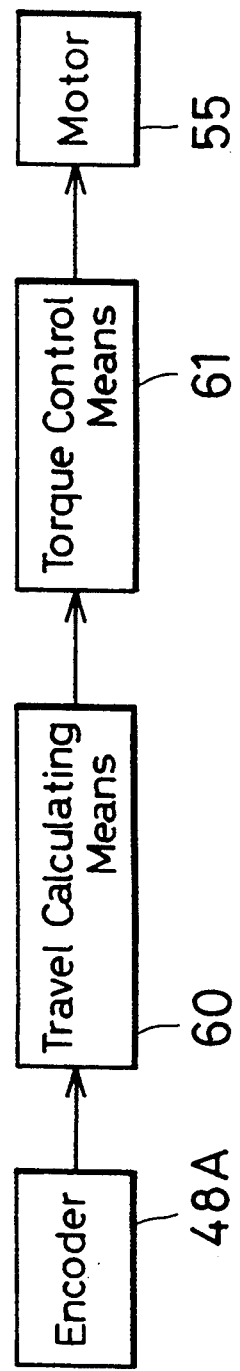
FIG. 10 is a diagram of a control circuit for a press control system of a third embodiment of a manufacturing apparatus of the invention.

Next, the cutting step of thus obtained window molding will be explained referring to the control circuit diagram of the cutting control system of the manufacturing apparatus of the window molding of FIG. 9.

As described above, the rotational output of the encoder 48A is inputted into the travel calculating means 60 where the moving distance of the window molding is calculated. When the calculated distance reaches the specified value, the torque control means 61 is driven to form the vertical head 12V and the horizontal head 12H. The thus formed elongate body is fed to the cooling water tank 45 to be cooled and hardened, and transferred to the thickness measuring means 49A and 49B.

Here, the thickness measuring means 49A and 49B measure a thickness T1 and a thickness T2, and are able to judge, by the thicknesses T1 and T2 and a difference T1-T2 therebetween, which the measured position is among the vertical head 12V, the horizontal head 12H, a changing area from the vertical head 12V to the horizontal head 12H or a changing area from the horizontal head 12H to the vertical head 12V. Moreover, they can detect an angle by using the distance L therebetween. Therefore, the output of the thickness measuring means 49A and 49B is inputted into a thickness/angle computing means 95. The thickness/angle computing means 95 detects the slope angle from the thicknesses T1 and T2, the difference T1-T2 between them and the distance L of the extruded product 100, thereby judging which point of the extruded product 100 is detected at that time. A detection output of the slope angle thus obtained is inputted into a cutting length computing means 96 together with the output of the encoder 48B. The cutting length computing means 96 measures, upon the outputs, the length of the window molding or the total length of the right and left and upper edges of the front window glass 1, thereby positioning the horizontal head 12H at the center and the vertical heads 12V at both sides thereof. Then, the cutting length computing means 96 operates the cutter 47 when the computed length reaches the above length.

Figure 12:
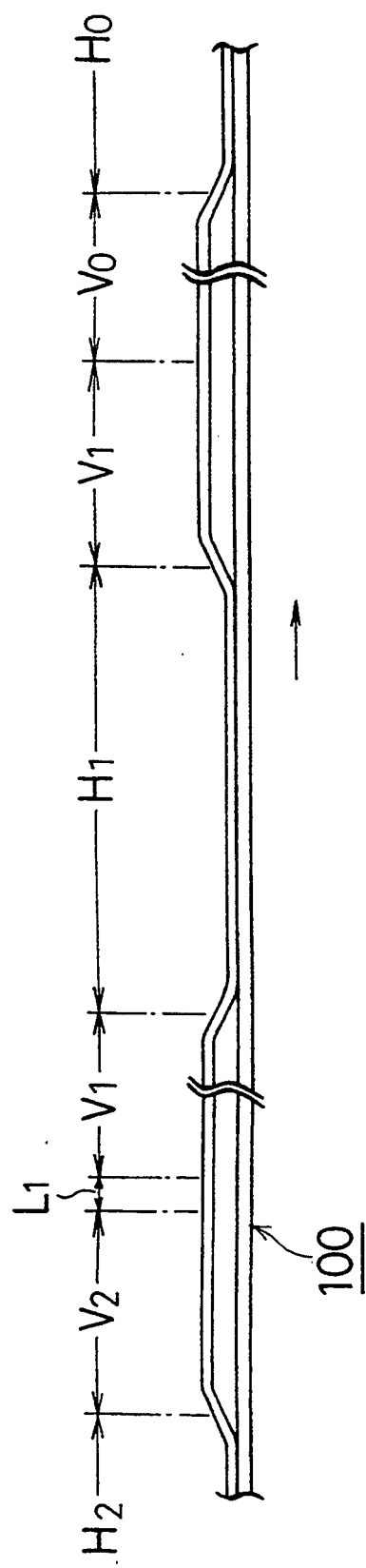
FIG. 12 is an explanation view showing how to determine a cutting distance of a window molding for automobiles using a thickness measuring means of a third embodiment of a manufacturing apparatus of the invention.

Here, FIG. 12 explains how to decide the cutting length of the window molding.

A length HO of the horizontal head 12H is measured from the thickness of the extruded product 100, at first. A length VO of the vertical head 12V is measured from a positive value of the difference T1-T2 or the slope angle detected by the thickness measuring means 49A, 49B, thereafter. Then, the window molding is cut at a predetermined length. At this time, the thickness measuring means 49A, 49B have proceeded to further measuring work toward the extruding side than a surplus length L1.

Namely, the thickness measuring means 49A, 49B start measuring from a point of detection of the thickness of the vertical head 12V, for further measurement of the length V1 of the vertical head 12V. Next, they start measuring from a point of detection of the negative value of the difference T1-T2 or the downward slope to a point of detection of the positive value of the difference T1-T2 or the upward slope, for measurement of the length H1 of the horizontal head 12H. Then, they start measuring from a point of detection of the positive value of the difference T1-T2 or the upward slope, for further measurement of the length V1 of the vertical head 12V. Thereafter, from a view point of an appearance in assembly to the car body, they make the cutter 47 cut a boundary between a length VO and the length V1 of the vertical heads 12V. Thus, a pair of the vertical heads 12V of the lengths V1 are disposed at both sides of the horizontal head 12H, while the horizontal head 12H of the length H1 is placed at their center. At this time, if there is any surplus length of the extruded product 100, they operate the cutter 47 to cut off the surplus. For example, if there is brought forth a surplus length L1 between the vertical heads 12V of the length V1 and the length V2, such surplus L1 is cut off.

Here, the present embodiment is explained on condition that there is provided one cutter 47. However, the present invention may be embodied in a mode in which two cutters are used to cut simultaneously the vertical heads 12V at both sides of the extruded product 100 while using a longitudinal center of the horizontal head 12H as a center in cutting.

As mentioned above, the third embodiment has a moving distance detecting means which are composed of the thickness/angle detecting means 95 and the encoder 48B which detect the moving distance from the point where the measurement is started by a pair of thickness measuring means 49A, 49B, namely the light emitting means and the light receiving means. Therefore, a change point of thickness and a distance from this change point of an elongate body such as the extruded product 100 are detected by a pair of thickness measuring means 49A, 49B and the encoder 48B, thereby being able to measure a predetermined length based upon the change point. Particularly, the present embodiment is preferable in measurement for an elongate body that requires high accuracy positioning, e.g., the window molding for automobiles which has different thicknesses at the vertical head 12V and the horizontal head 12H and in which the appearance is affected in the assembled state unless the horizontal head 12H is placed at the center. Moreover, the present embodiment adopts an optical measurement, so that it is possible to improve measuring accuracy for a thickness measuring means and to realize control which is not substantially affected by noises, if used in a production line of a factory. Specially, the measurement accuracy can be made high since a laser beam is used as an irradiation source. Furthermore, it is possible to measure a length of an elongate body while using, as a reference point, a point of thickness change or a point of no thickness change, by the moving distance detecting means that detects the moving distance from the measured position of the elongate body.

If the upper surface of the elongate extruded product 100 is warped, there takes place displacement vertically to the travel direction of the extruded product 100. In this case, a distance from the measuring point of the measuring means 49A, 49B changes, so that a measuring error is large. Therefore, if the upper surface of the extruded product 100 is warped, it is preferable to provide a structure that prevents a vertical movement to the moving direction of the extruded product 100. Namely, there may be disposed a guide which limits the vertical movement relative to the moving direction of the extruded product 100, such as the jig 43 and the guide 43a shown in FIG. 5. Of course, it is desirable to use a guide which corresponds to a lower shape of the extruded product 100, because it restricts the position of the upper surface thereof.

It is inevitable that the encoders 48A and 49B are contacted with the elongate extruded product 100 when they detect the moving distance. In case there is a possibility that the product 100 is damaged by contact, a non-contact type detector of a laser doppler type may be used as the moving distance detecting means.

Here, the above embodiment of the measuring apparatus of the elongate body having thickness change uses the semiconductive lasers 81, as a pair of light emitting means, while the semiconductor laser 81 is provided in the thickness measuring apparatus 49A, 49B, and the light emitting means is arranged in different positions in the longitudinal direction of the elongate body so as to radiate a light beam from a vertical direction to the longitudinal direction of the elongate body. However, in putting the invention in practice, it is enough if illuminating points of the irradiation light are separated in the longitudinal direction of the elongate body; accordingly, it is not important whether the distance therebetween is long or short. Still, in case the distance between illuminating points is equal to a distance of the thickness change between the vertical head 12V and the horizontal head 12H, it becomes easy to measure a length of an elongate body having thickness change such as, e.g., the window molding including the vertical heads 12V and the horizontal head 12H, only by a comparison circuit simplified as the thickness/angle measuring means 71.

Moreover, while thee present embodiment computes the thicknesses T1 and T2, the difference T1-T2 and the slope angle $\tan^{-1}(T1-T2)/L$, the present invention can be embodied using a combination of two or more of these.

In the above embodiment of the measuring apparatus of the elongate body having thickness change, a pair of light receiving means has the optical position detectors 84, provided in a pair of thickness measuring means 49A and 49B, while the light receiving means or the optical position detectors 84 receive respectively the reflected light of the elongate body radiated from a pair of light sources and detect the thickness change. However, in concretizing the invention, the light receiving means are not limited in the one-directional element, but may be incorporated into those which can detect the position of the irradiation light spot.

In the above embodiment, a pair of light emitting means and light receiving means are used to measure the vertical head 12V and the horizontal head 12H. However, in practicing the invention, other structure may be used. For example, they may be a first thickness measuring means composed of the thickness measuring means 49A at extruder side and a second thickness measuring means composed of the thickness measuring means 49B at cutter side, both of which are disposed at different positions in the longitudinal direction of the elongate body like the extruded product 100. Moreover, the first measuring means and the second measuring means may be so structured as to be separated a predetermined distance in the longitudinal direction of the elongate body.

Moreover, the above embodiment has the first thickness measuring means composed of the thickness measuring means 49A at extruder side and the second thickness measuring means composed of the thickness measuring means 49B at cutter side, which are disposed at different positions in the longitudinal direction of the elongate body like the extruded product 100. However, in embodying the invention, one of the thickness measuring means 49A and 49B can be omitted.

Namely, giving an example that omits the thickness measuring means 49B, a value measured by the thickness measuring means 49A is stored into a memory that shifts addresses according to signals from the encoder 49B. Thus, it is possible to compute a change of an angle or a slope of the elongate body such as the extruded product 100 on the basis of the stored values. Since the distance of the thickness measuring positions have influence on its accuracy, it is necessary in computing measuring positions according to degree of the slope.

With this structure, the number of thickness measuring means can be reduced to one, so it is advantageous in view of cost. Moreover, an apparent error of the thickness measuring means can be decreased since there is no influence of relative error by using only one thickness measuring means.

Furthermore, the moving distance detecting means is composed of the encoder 48B to detect the moving distance of the elongate body from the position measured by the light emitting means and the light receiving means as pairs. However, when the number of changing points is singular, another means can be adopted as the moving distance measuring means, if it is able to specify the distance to the cutter 47 or the like and measure the moving distance of the elongate body. Or it can be a contact type or a noncontact type.

Next, a manufacturing apparatus will be described, which is applicable to an inline production of the window molding for automobiles, and which is used in a fourth embodiment of a manufacturing method of the invention of an elongate body having thickness change. At the same time, a manufacturing method for the window molding is explained using the manufacturing apparatus. The fourth embodiment is mainly different from the above embodiments in that there is provided a length measuring machine which measures a length of an insert in the extruder 41.

Figure 13:
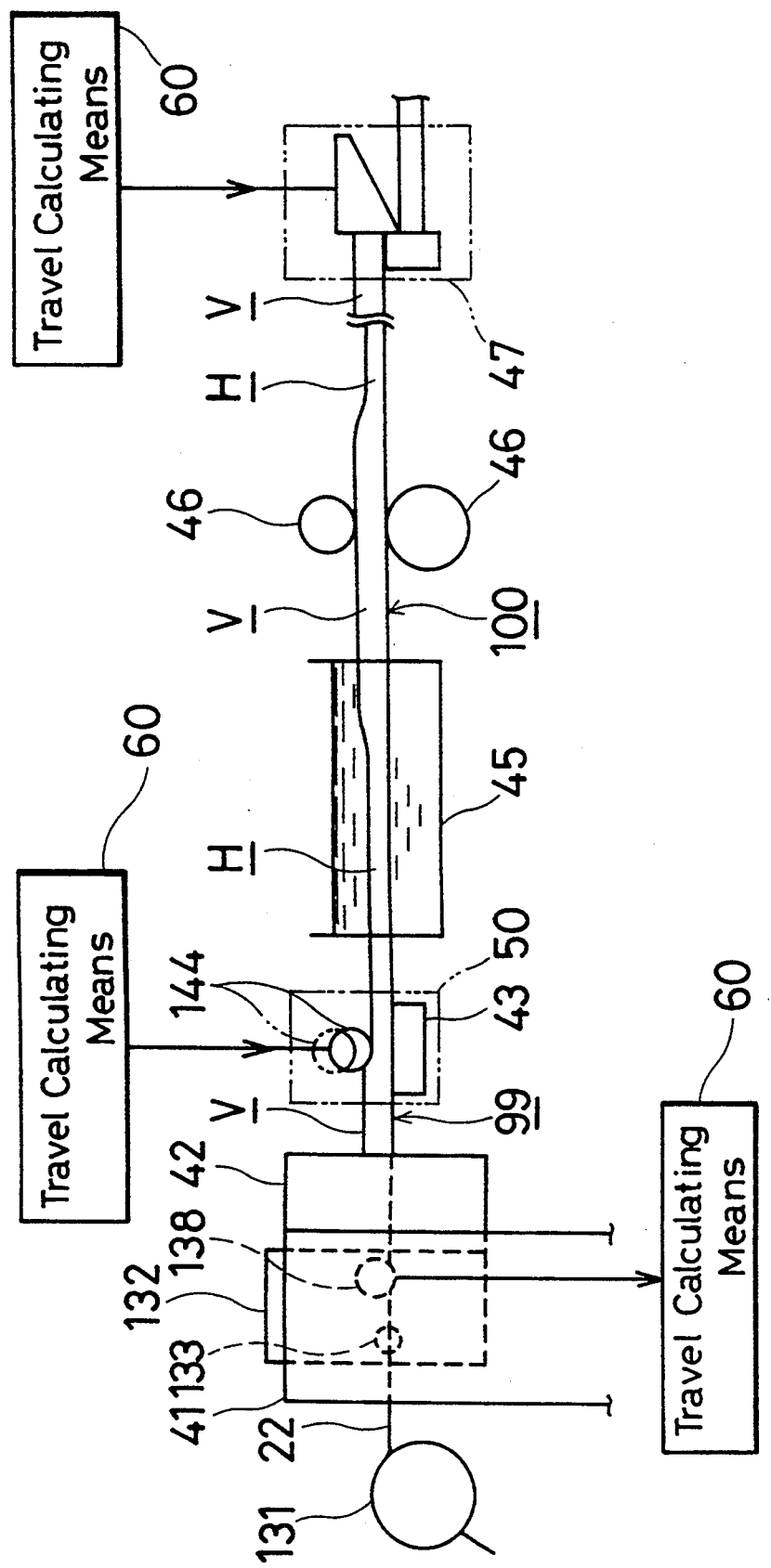
FIG. 13 is a schematic side view of a manufacturing apparatus for forming a window molding for automobiles used in a fourth embodiment of a manufacturing method of the invention for forming an elongate body having thickness change.
Figure 14:
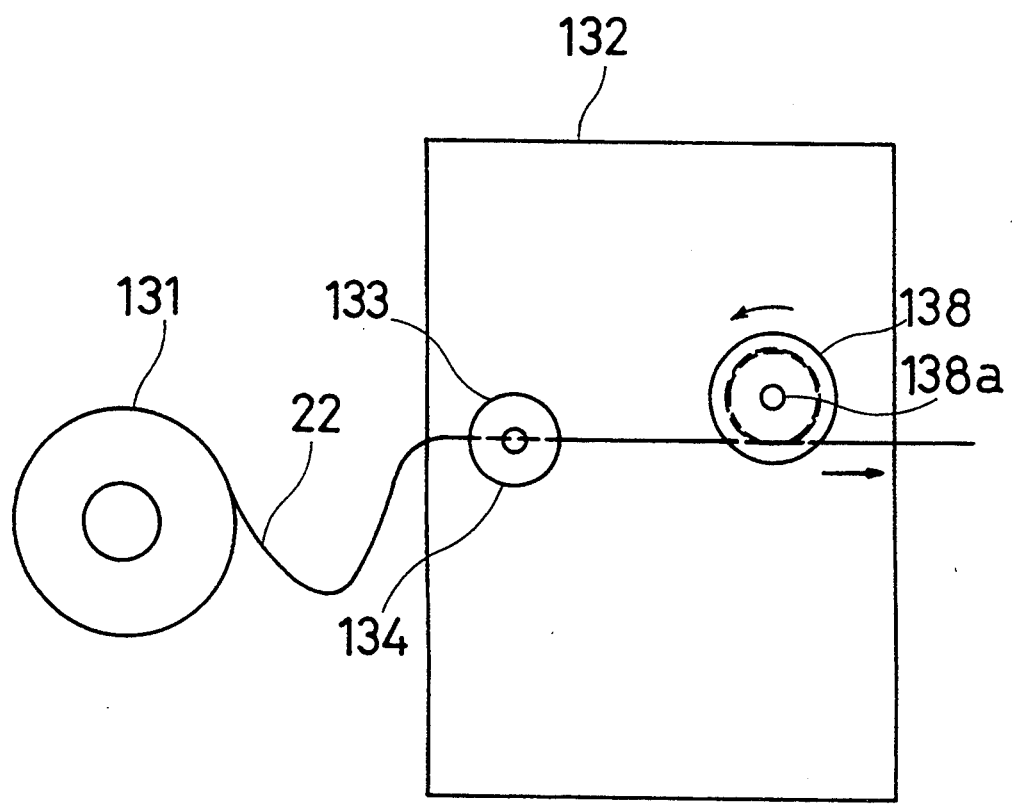
FIG. 14 is a side view of a length measuring machine used in a fourth embodiment of a manufacturing method of the invention.

As shown in FIG. 13, a feed reel 131 is disposed ahead of the extruder 41. The metal wire 22 is wound on the feed reel 131 as the insert so that it is able to supply its leading end into the extruder 41. Here, while a brass wire with an adhesive coated on its periphery is used as the metal wire 22 in this embodiment, another wire can be used as long as it is metal and applicable to the insert. A length measuring machine 132 is arranged inside the extruder 41. It measures a length of the metal wire 22 fed from the feed reel 131 to send it to the extrusion head 42 of the extruder 41. Thus, the metal wire 22 is embedded and fixed successively into the longitudinal direction of the extruded body 99, which has the same section as the vertical member V extruded from the extrusion head 42.

Figure 17:
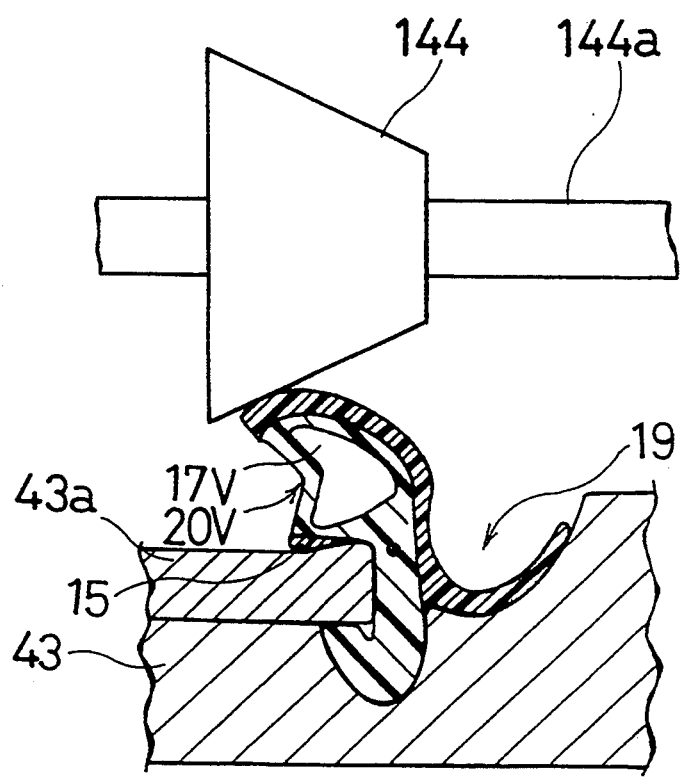
FIG. 17 is a schematic front view showing a releasing state of a press forming machine used in a fourth embodiment of a manufacturing method of the invention.

In the present embodiment, a moving means for moving up and down a press roller 144 has a structure as follows. Namely, a leading end of a piston rod of an air cylinder (not shown) is connected with an axis 144a of the press roller 144 (FIG. 17). The air cylinder is driven by a solenoid valve. The jig 43 and the press roller 144 used herein as well as the air cylinder and the solenoid valve and the like form the press forming machine 50 of the present embodiment.

Further, a detailed description will be made in respect of the length measuring machine 132 and the press roller 144 of the present embodiment of the manufacturing apparatus for the window molding. A control system for the press roller 144 and the cutter 47 will be mentioned simultaneously.

Figure 15:
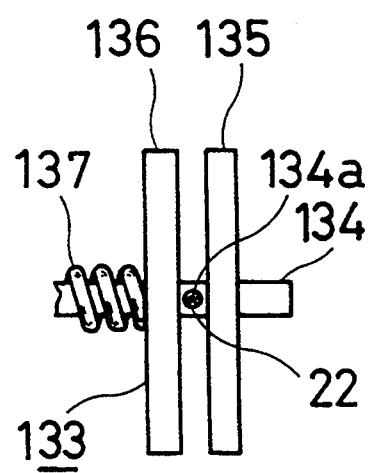
FIG. 15 is a front view of a sandwiching means of a length measuring machine used in a fourth embodiment of a manufacturing method of the invention.
Figure 16:
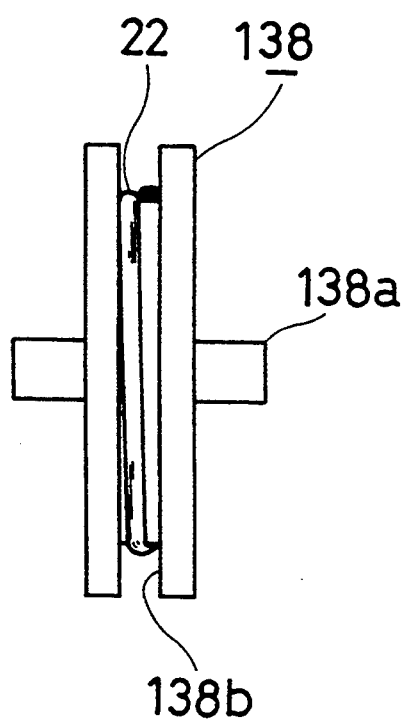
FIG. 16 is a front view of a measuring roller of a length measuring machine used in a fourth embodiment of a manufacturing method of the invention.

The length measuring machine 132 has a sandwiching means 133 near the feed reel 131. As shown in FIG. 15, the sandwiching means 133 has a fixed shaft 134 arranged at right angles to the metal wire 22 fed from the feed reel 131. The fixed shaft 134 has a guiding hole 134A at about its longitudinal center for the mental wire 22 to pass therethrough. A circular fixed plate 135 is secured to one side of the through hole 134a of the fixed shaft 134. A circular moving plate 136 is arranged on the other side of the through hole 134a of the fixed shaft 134 in a facing manner to the fixed plate 135. The moving plate 136 is urged toward to the fixed plate 135 by a spring 137, thereby resiliently holding the metal wire 22 passing through the guiding hole 134a of the fixed shaft 134 along with the fixed plate 135. On the other hand, a measuring roller 138 illustrated in FIG. 16 is disposed in the length measuring machine 132 near the extrusion head 42. The measuring roller 138 has a rotating shaft 138a disposed parallel to the fixed shaft 134 of the sandwiching means 133. The measuring roller 138 has a dented guiding groove 138b along its circumferential direction so that the metal wire 22 fed from the sandwiching means 133 is wound therearound. Thus, the metal wire 22 fed from the feed reel 131 is given a fixed tension to be tight between the sandwiching means 133 and the measuring roller 138. On that condition, the metal wire 22 is transferred to the extrusion head 42 and extruded while embedded into the extruded body 99.

Figure 20:
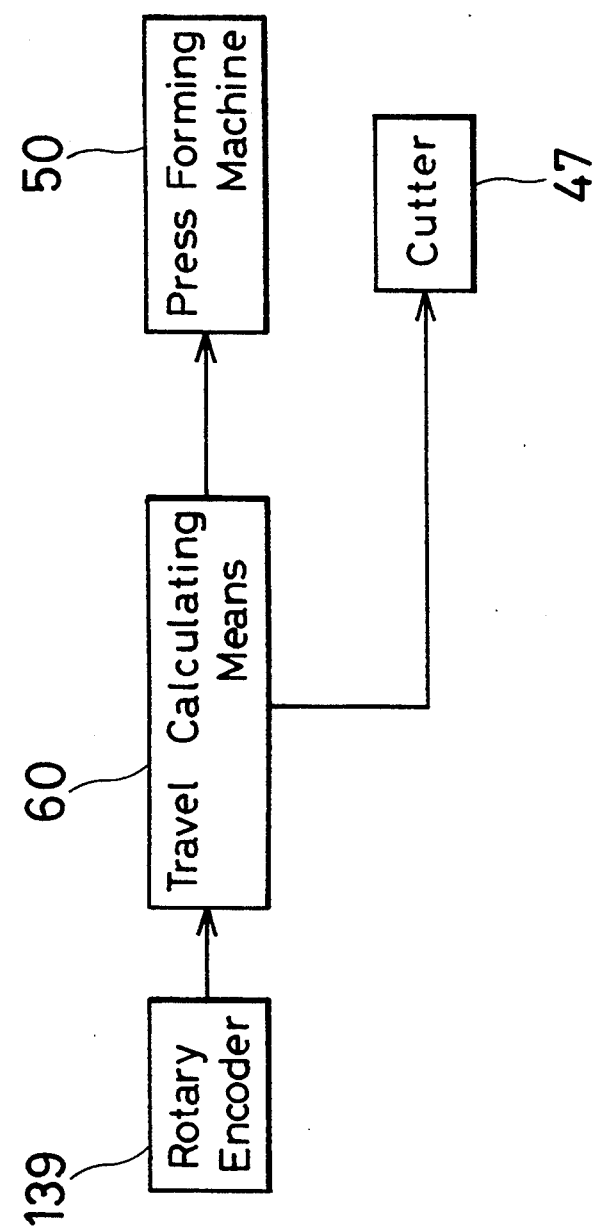
FIG. 20 is a diagram of a control circuit of a manufacturing apparatus used in a fourth embodiment of the invention.

As shown in FIG. 20, a rotary encoder 139 is connected with the rotating shaft 138a of the measuring roller 138 to output pulses corresponding to rotational amount of the measuring roller 138. The output or pulses of the rotary encoder 139 are inputted into the travel calculating means 60 and counted by a counter. Thus, the travel calculating means 60 computes the moving distance or the feeding length of the metal wire 22 traveled by the measuring roller 138. Here, since the metal wire 22 is transferred in a tensioned manner between the sandwiching means 133 and the measuring roller 138, the output pulses of the rotary encoder 139 are exactly proportional to the length of the metal wire 22 that passes through the measuring roller 138. Thus, there is no fear of errors in measurement.

In extruding the extruded body 99, the adhesive coated on the metal wire 22 is melted by heat of a molten synthetic resin. Such adhesive is again hardened when the extruded body 99 is cooled and set, thereby joining and fixing the metal wire 22 and the synthetic resin to reach other so as to prevent their slide in the extruded body 99. Thus, the metal wire 22 regulates contraction of the extruded body 99 molded from the extrusion head 42 due to temperature difference in cooling. Therefore, the feeding length of the metal wire 22 is always the same as the extruding length of the extruded product 100. As a result, it is possible to determine a pressing area of the extruded body 99, namely a start point and a release point in pressing by the press roller 144 as well as the cutting point of the extruded product 100.

At first, the travel calculating means 60 drives the solenoid valve and the air cylinder to carry out a prescribed control, on the basis of a computed result, when the moving distance of the metal wire 22 reaches a specified length. That is, the press roller 144 is controlled so as to change its height corresponding to a shape of a product from the vertical head 12V to the horizontal head 12H or vice versa.

Namely, the output pulses are proportional to the moving distance of the metal wire 22, which is the same as the distance of the window molding extruded from the extrusion head 42. The pulses proportional to the extruded distance of the window molding are inputted from the rotary encoder 139 into the travel calculating means 60 to calculate the moving distance of the window molding. When the moving distance of the window molding reaches the specified length after starting the extrusion, the travel calculating means 60 drives the solenoid valve and the air cylinder to lower the press roller 144. Thereby, the pressing force therefrom is increased in accordance with the product shape changing from the vertical head 12V to the horizontal head 12H. Namely, the pressing force is controlled according to the product shape so that its height changes from the height of the vertical head 12V to the height of the horizontal head 12H. Then, the travel calculating means 60 controls the pressure of the press roller 144 via the solenoid valve and the air cylinder so that the press roller 144 keeps a pressing position for the area corresponding to the horizontal head 12H.

Figure 18:
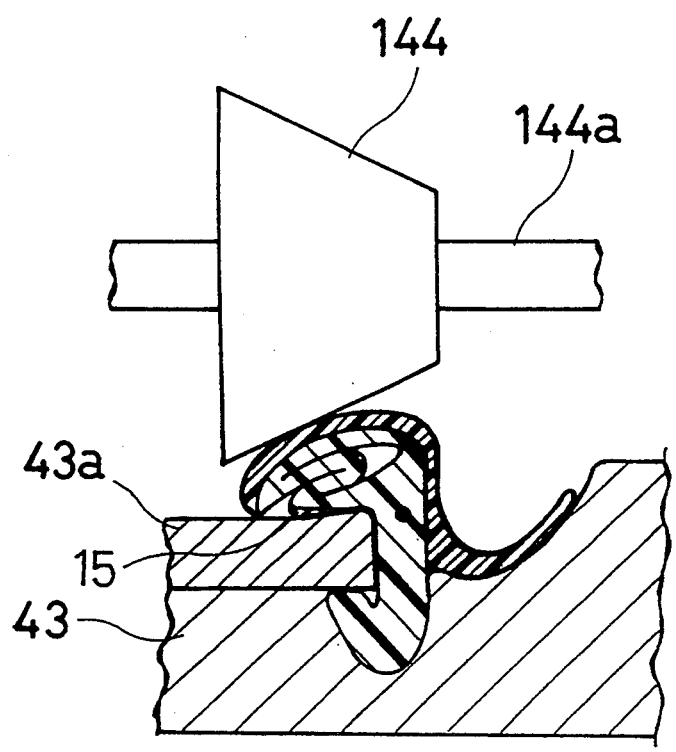
FIG. 18 is a schematic front view showing a pressing state of a press forming machine used in a fourth embodiment of a manufacturing method of the invention.

Thereby, the press roller 144 moves from a standby position shown in FIG. 17 to a pressing position shown in FIG. 18. Thus, the press roller 144 collapses the head of the extruded body 99 (vertical head 12V) which is in a softened state just after extrusion, since the cavity 17V in the vertical head 12V permits it to be deformed. Therefore, the horizontal member H is formed into the section shown in FIG. 2 and FIG. 18, so that the deformed cavity 17H is provided in the horizontal member H; the cavity 17H having a section smaller than and different from the section of the cavity 17V of the vertical member V. At the same time, the folding piece 16 of the horizontal member H is bent at the corner to have its outer surface overlapped to form the deformed glass side gutter 20H, thereby to be piled up on the outer support 15. Here, since the above deformation from the vertical head 12V to the horizontal head 12H is carried out by use of elastic deformation, there is no need of any special steps such as coating of an adhesive on the surface of the folding piece 16.

Figure 19:
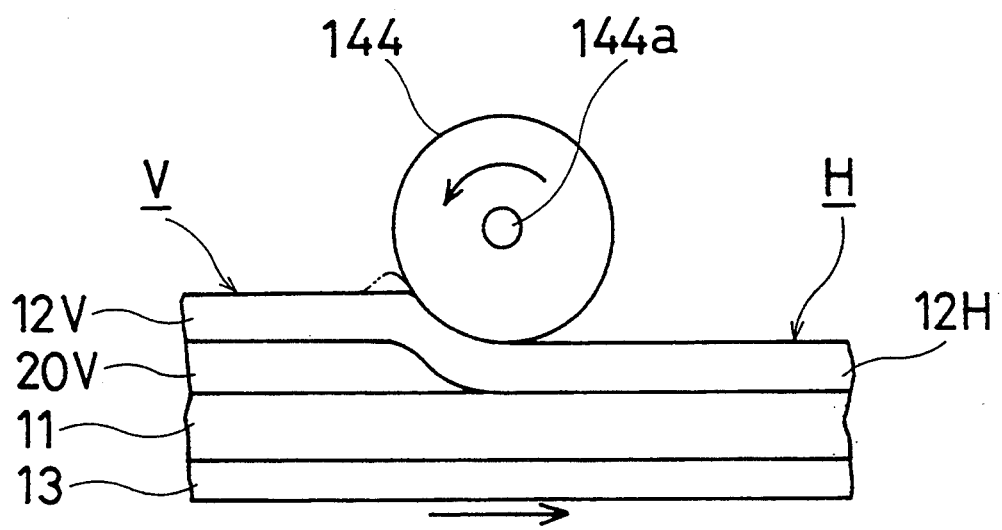
FIG. 19 is a schematic side view showing a pressing state of a press forming machine used in a fourth embodiment of a manufacturing method of the invention.

In case the press roller 144 is not rotated but is stationary, there is brought forth friction between the extruded body 99 and the circumferential surface of the press roller 144 in moving the extruded body 99. As a result, the upper surface of the extruded body 99 is distorted and wrinkled, as shown by tow-dot chain line in FIG. 19, thereby, possibly causing defective products. However, in the present embodiment, as shown in FIG. 19, the press roller 144 is rotated following the travel of the extruded body 99, thereby decreasing the friction between the press roller 144 and the extruded body 99. Thus, the extruded body 99 is kept in the predetermined section, and it becomes easy to load the extruded body 99 in the pressing and collapsing direction.

When the pressed area of the window molding reaches the preset length, contrary to the above, the travel calculating means 60 controls operation of the solenoid valve and the air cylinder to move the press roller 144 upward and decrease the pressing force in accordance with the product shape changing from the horizontal head 12H to the vertical head 12V. Namely, the pressing force is controlled according to the product shape so that its height changes from the height of the horizontal head 12H to the height of the vertical head 12V. Thereafter, the travel calculating means 60 stops the working of the solenoid valve and the air cylinder, finally, thereby returning the press roller 144 from the pressing position of FIG. 18 to the retracted position of FIG. 17, thus permitting formation of the vertical member V thereafter.

The extruded product 100 is drawn out by the drawing roller 46 and sent to the cooling water tank 45 to be cooled and hardened and kept into the above mentioned predetermined cross-section, after having passed the jig 43 and the press roller 144 as the press forming machine 50. Then, the extruded product 100 is traveled to the cutter 47 by transferring/drawing rollers (not shown) to be cut into a fixed length.

Namely, the travel calculating means 60 judges, from the output pulses of the rotary encoder 139 of the length measuring machine 132, which part of the extruded product 100 is positioned at the cutter 47 at present. Then, the travel calculating means 60 calculates the length of the extruded product 100 so that a pair of vertical members V of a specified length are positioned at both sides of the horizontal member H as a center. That is, the travel calculating means 60 calculates a total length of the right and left and upper edges of the front window glass 1 from pulses outputted from the rotary encoder 139. When the length of the extruded product 100 that has passed the cutter 47 reaches the above length, measuring from the leading end of the vertical member V at the leading end side, the cutter 47 is operated. Thereby, the extruded product 100 is cut and the present embodiment of the window molding for automobiles is completed. Thereafter, the process mentioned above is repeated as desired.

Accordingly, with the present embodiment, it is possible to give thickness change to the extruded body 99 so as to successively form the vertical head 12V and the horizontal head 12H by pressing and joining the vertical head 12V of the extruded body 99 to the outer support 15 to make the horizontal head 12H. That is, since the vertical head 12V of the extruded body 99 is pressed and stuck on the outer support 15 in the softened state, joining of the vertical head 12V and the outer support 15 can be carried out by plastic deformation of themselves. Thus, there is no need for special means such as coating adhesive and sticking the glass side, guide groove 20V. As a result, it is possible to eliminate extra steps like the adhesive coating step, thereby improving manufacturing efficiency. Moreover, there are no problems such as leaking of the adhesive from the deformed glass side gutter 20H after deformation, which will affect the appearance. Here, a feeding length of the metal wire 22 that is supplied and embedded into the extruded body 99 is measured, and pressing area of the vertical head 12V of the extruded body 99 and the cutting position of the extruded product 100 are determined. Therefore, contrary to the case that the extruded body 99 or the extruded product 100 is measured, there is no fear that an error takes place in measured values due to contraction by temperature difference before and after the cooling step. Therefore, it is possible to make exact and correct the pressing area of the extruded body 99 and the cutting length of the extruded product 100. As a result, it is possible to improve dimensional accuracy of the window molding as a final molded product, thereby preventing defective products and stably obtaining products of good quality.

In the above embodiment, in order to measure the feeding length of the metal wire 22, the measurement is carried out while the metal wire 22 is tensioned. However, any structure may be applicable if it is able to measure correctly the length of the metal wire 22 embedded into the extruded body 99, so any detecting means of contact type or non-contact type can be used. While the window molding of the section shown in FIGS. 1 and 2 is taken as the elongate body having thickness change, in the above embodiment, this invention is applicable to other elongate bodies as long as they require a thickness change. For example, a window molding for automobiles is applicable which lacks the folding piece 16. In such molding, a whole space between the vertical head 12V and the outer support 15 serves as the glass side guide groove 20V at the vertical member V. On the other hand, The horizontal head 12H and the outer support 15 are joined at the horizontal member H. Moreover, another window molding for automobiles is applicable. Such molding has the seal lip 18 contacted not to the inner surface but to the upper surface 2a of the window frame 2 so as to eliminate the conduit 19, or the like.

The preferred embodiments described herein are therefore illustrative and not restrictive, the scope of the invention being indicated in the appended claims and all variations which come within the meaning of the claims are intended to be embraced therein.

What is claimed:

1. A manufacturing method for forming an elongate body having thickness change, comprising the steps of:
   extruding the elongate body of a synthetic resin having a cross-section that forms a gap between a pair of spaced, opposed and separate lips constituting a first portion of the elongate body; and
   pressing a portion of said first portion of the elongate body by a press roller at a constant pressure while moving the elongate body in a longitudinal direction within a fixed range, thereby reducing the gap and integrally joining the lips in a predetermined length according to a longitudinal position of the lips so as to define a second portion of the elongate body having a thickness less than said first portion of the elongate body;
   measuring a thickness of the elongate body at predetermined intervals in the longitudinal direction thereof; and
   detecting a moving distance of the elongate body between a first measuring position measured in the thickness measuring step and a second measuring position different from the first measuring position,
   said thickness measuring step including the step of determining a longitudinal position of the elongate body on the basis of a thickness of the first measuring position, a thickness of the second measuring position and a difference between the thicknesses of the first measuring position and the second measuring position.

2. A manufacturing method according to claim 1, wherein the thickness measuring step determines the longitudinal position of the elongate body by computing a slope angle between the first measuring position and the second measuring position on the basis of a thickness of the first measuring position, a thickness of the second measuring position, a difference between the thicknesses of the first measuring position and the second measuring position and a distance between the first measuring position and the second measuring position.

3. A manufacturing method according to claim 2, wherein the detecting step detects the moving distance of the elongate body from a boundary portion as a reference point placed between the first portion wherein the lips are separated and the second portion wherein the lips are joined, and further comprising the step of cutting the elongate body by a specified length on the basis of a detected value of the moving distance of the elongate body.

4. A manufacturing method according to claim 3, wherein the pressing step includes moving the elongate body in a longitudinal direction while detecting a moving distance thereof, and gradually increasing the pressure of the press roller so as to gradually diminish a gap defined between the lips and joining the lips when the moving distance of the elongate body reaches a specified distance, thereby forming the first portion wherein the lips are separated, a dividing portion successive to the first portion and the second portion successive to the dividing portion wherein lips are joined, and wherein the distance between the first and second measuring positions is set within a distance of the dividing portion in the thickness measuring step.

* * * * *